(12) United States Patent
Matthews et al.

(10) Patent No.: US 10,031,398 B2
(45) Date of Patent: Jul. 24, 2018

(54) SPECTROSCOPY APPARATUS AND METHOD

(71) Applicant: The University of Bristol, Bristol (GB)

(72) Inventors: Jonathan C. F. Matthews, Bristol (GB); Damien Bonneau, Bristol (GB); Mark Gerard Thompson, Bristol (GB)

(73) Assignee: The University of Bristol, Bristol (GB)

( * ) Notice: Subject to any disclaimer, the term of this patent is extended or adjusted under 35 U.S.C. 154(b) by 174 days.

(21) Appl. No.: 14/789,162

(22) Filed: Jul. 1, 2015

(65) Prior Publication Data
US 2016/0041032 A1 Feb. 11, 2016

(30) Foreign Application Priority Data

Aug. 7, 2014 (GB) .................................. 1414006.5

(51) Int. Cl.
*G02F 1/35* (2006.01)
*G02F 1/39* (2006.01)
(Continued)

(52) U.S. Cl.
CPC .......... *G02F 1/3536* (2013.01); *G01J 3/0205* (2013.01); *G01J 3/0218* (2013.01);
(Continued)

(58) Field of Classification Search
CPC .................... G02F 1/3526; G02F 1/39; G02F 1/3536–1/3538; G01J 3/0205;
(Continued)

(56) References Cited

U.S. PATENT DOCUMENTS 3,609,389 A * 9/1971 Bjorkholm ............ H01S 3/1083
 331/107 R
5,552,926 A * 9/1996 Owa ......................... G02F 1/37
 359/326
(Continued)

FOREIGN PATENT DOCUMENTS

| CN | 102736181 A | * | 10/2012 |
| JP | 11149653 A | * | 6/1999 |
| WO | 2005074525 | | 8/2005 |

OTHER PUBLICATIONS

Clemmen, Stéphane, et al. "Continuous wave photon pair generation in silicon-on-insulator waveguides and ring resonators." Optics express 17.19 (2009): 16558-16570.*
(Continued)

*Primary Examiner* — Hina F Ayub
(74) *Attorney, Agent, or Firm* — Kilpatrick Townsend & Stockton LLP

(57) ABSTRACT

There is presented a spectroscopic apparatus and method wherein an input light source that inputs pump light to a photon pair source. The photon pair source converts pump photons into signal and idler photon pairs. The photon pair source is, in some of examples described herein, tuneable so that the wavelength of the signal and idler photons can be changed by application of a tuning means. At least one of the signal and idler photons is made incident upon a medium under test. A heralding detection apparatus is used to detect any signal and idler photons output from the spectroscopy apparatus, wherein at least one of the photons of the pair has interacted with or been operated upon by the medium under test.

25 Claims, 13 Drawing Sheets

(51) Int. Cl.
*G01J 3/02* (2006.01)
*G01J 3/10* (2006.01)
*G01J 3/42* (2006.01)
*G01J 3/433* (2006.01)

(52) U.S. Cl.
CPC . *G01J 3/10* (2013.01); *G01J 3/42* (2013.01); *G01J 3/4338* (2013.01); *G02F 1/39* (2013.01)

(58) Field of Classification Search
CPC .... G01J 3/0218; G01J 3/10; G01J 3/42; G01J 3/4338
USPC .......................................................... 356/402
See application file for complete search history.

(56) References Cited

U.S. PATENT DOCUMENTS

| | | | | |
|---|---|---|---|---|
| 6,167,067 | A * | 12/2000 | Meyer, Jr. ................. | G02F 1/39 359/330 |
| 7,088,824 | B1 * | 8/2006 | Takeuchi .................. | G02F 1/39 380/256 |
| 2004/0096151 | A1 * | 5/2004 | Svilans ..................... | G01J 3/12 385/27 |
| 2004/0146431 | A1 * | 7/2004 | Scherer .................... | G01N 21/7746 422/82.05 |
| 2005/0243324 | A1 | 11/2005 | Freeling et al. | |
| 2007/0160093 | A1 * | 7/2007 | Nishizawa .............. | G02F 1/3534 372/21 |
| 2009/0268276 | A1 * | 10/2009 | Lee ........................ | H04B 10/70 359/330 |
| 2010/0111541 | A1 * | 5/2010 | Trojek .................... | G02F 1/3526 398/152 |
| 2010/0277712 | A1 * | 11/2010 | Zaugg ..................... | G01S 17/02 356/5.01 |
| 2012/0298849 | A1 * | 11/2012 | He ........................... | G01D 5/35319 250/227.14 |
| 2014/0218747 | A1 * | 8/2014 | Wong ....................... | G01B 9/02 356/491 |
| 2014/0376001 | A1 * | 12/2014 | Swanson ............... | A61B 5/0066 356/479 |
| 2015/0261058 | A1 * | 9/2015 | Silverstone ............. | G02F 1/395 385/3 |

OTHER PUBLICATIONS

Piro, Nicolas, et al. "An entangled photon source for resonant single-photon-single-atom interaction." Journal of Physics B: Atomic, Molecular and Optical Physics 42.11 (2009): 114002.*

Grassani et al., Generation of time-energy entangled photons on a silicon chip, 16th International Conference on Transparent Optical Networks (ICTON), Jul. 2014, 4 pages.

Helmy, Breakthroughs in Photonics 2013: Electrically Pumped Semiconductor Entangled Sources, IEEE Photonics Journal, vol. 6, No. 2, Apr. 2014, 7 pages.

Jechow et al., High brightness, tunable biphoton source at 976 nm for quantum spectroscopy, Optics Express, vol. 16, No. 17, 2008, 13439-13449.

Kalachev et al., Biphoton spectroscopy in a strongly nondegenerate regime of SPDC, Laser Physics Letters, vol. 5, No. 8, Aug. 2008, pp. 600-602.

Kalachev et al., Biphoton spectroscopy of YAG:Er3+ crystal, Laser Physics Letters, vol. 4, No. 10, Oct. 2007, pp. 722-725.

Scarcelli et al., Remote spectral measurement using entangled photons, Applied Physics Letters, vol. 83, No. 26, Dec. 29, 2003, pp. 5560-5562.

Yabushita, et al., Spectroscopy by frequency-entangled photon pairs, Physical Review, vol. 69, Issue 1, Jan. 14, 2004, pp. 013806-1-4.

Kingdom Application No. 1414006.5, Search Report dated Jan. 30, 2015, 4 pages.

Kingdom Application No. 1414006.5, Supplemental Search Report dated Jun. 24, 2015, 2 pages.

* cited by examiner

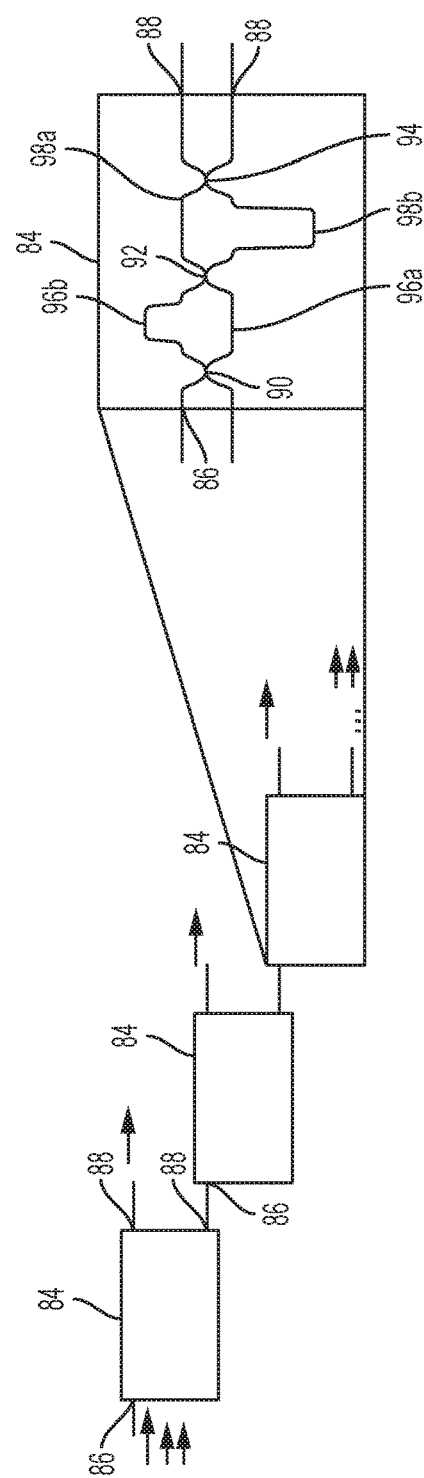

SPECTROSCOPY APPARATUS AND METHOD

CROSS-REFERENCE TO RELATED APPLICATION

This claims priority to United Kingdom Patent Application No. 1414006.5 filed with the United Kingdom Patent Office on Aug. 7, 2014, the entire contents of which are incorporated herein by reference.

TECHNICAL HELD

The present invention relates to an apparatus for measuring a property of a medium using light. In particular the present invention relates to a spectroscopy apparatus for measuring the wavelength dependent absorbance of light by a medium.

BACKGROUND

Spectroscopy systems are typically used to measure radiation intensity as a function of wavelength. Various types of spectroscopic systems exist including transmission spectroscopy, absorbance spectroscopy and reflection spectroscopy. When making optical measurements, particularly when trying to detect low values of optical signals, one has to take into account of the presence of shot noise. Shot noise is a minimum noise level present in standard optical measurements that arises from the particle nature of light. Even with a perfect detector and a perfectly coherent laser source, shot noise still exists because the laser source has a poissonian variance in the number of photons in a beam incident upon the detector at any given time. This variation gives rise to shot noise. Shot noise is particularly problematic when trying to detect low optical signals because such signals are indistinguishable at the detector from the shot noise level. For example, this can be an issue when measuring the absorption spectra of a medium.

Different methods of performing spectroscopy exist. Some techniques use monochromators which selectively output different wavelengths of monochromatic light from a light input covering a broad range of wavelengths. One spectroscopy technique is bi-photon spectroscopy which detects entangled signal and idler photon pairs generated from a nonlinear optical process.

Bi-photon spectroscopy has been demonstrated by Scarcelli et al, "Remote spectral measurement using entangled photons", Applied Physics Letters 83, 5560 (2003). This paper describes a remote spectrometer using Spontaneous Parametric Down Conversion (SPDC) and a remote scanning monochromator to analyse a range of infrared wavelengths. The signal photon was sent to a remote location passing through an optical element whose spectral function was to be measured. The idler photon passed through the monochromator. The signal and idler photons were detected by photon counting detectors.

Atushji Yabushita et al. "Spectroscopy by frequency-entangled photon", Physical Review A 69, 013806 (2004) describes generating frequency-non degenerate photon pairs by SPDC, separating the signal and idler photons using a polarising beam splitter and diffracting the vertically polarised signal photons using a grating. The grating was rotatable to allow the apparatus to scan through different wavelengths. The horizontally polarised photons were directed through a partially absorptive sample. The signal and idler photons were collimated into optical fibres by lenses and then detected by a set of two single photon counting modules.

A. A. Kalachev et al. "Biphoton spectroscopy in a strongly nondegenerate regime of SPDC", Laser Phys. Lett. 5, No. 8, 600-602 (2008) describes generating degenerate biphotons by SPDC using type 1 collinear phase matching, separating the signal and idler photons with a beam splitter, passing the signal photons through a sample whilst sending the idler photons to a monochromator. Both signal and idler photons were detected using separate single photon counting modules.

A. A. Kalachev et al. "Biphoton spectroscopy of YAG:$Er^{3+}$ crystal" Laser Phys. Let. 4, No. 10, 722-725 (2007) describes generating photon pairs using a $LiIO_3$ crystal cut for type I degenerate collinear phase matching, separating the photon pairs using a beam splitter, passing the signal photons through the sample and sending the idler photons to a monochromator. Both photons were detected using detectors.

The use of rotatable gratings and monchromators makes the above experiments bulky and introduces extra losses into the system, which in turn increases the noise level of the spectroscopy apparatus.

Andreas Jechow at al. "High brightness, tuneable biphoton source at 976 nm for quantum spectroscopy", Optics express 13439, 18 Aug. 2008/Vol. 16, no. 17, describes a biphoton source using SPDC to generate photon pairs. The signal and idler photons were passed through a 50/:50 beam splitter before being detected by avalanche photodiodes. The use of a standard 50:50 beam sputter prior to the photons being detected by photodiodes splits the signal and idler photons non-deterministically. This set-up cannot provide sub-shot noise performance because the noise of the biphoton source, when being detected in this manner, is not sub-poissonian.

None of the above documents report sub shot noise performance.

SUMMARY

According to a first aspect of the present invention, there is provided a spectroscopy apparatus for measuring an optical property of a medium under test by detecting one or more photons of a photon pair; the apparatus comprising: a photon pair source configured to: receive pump light; and, convert at least one pump light photon into a wavelength non-degenerate signal and idler photon pair; the signal and idler photons being distinguishable from each other by at least one photon optical property; output the signal and idler photon pair; a means configured to tune the photon pair source to change the wavelengths of the signal and idler photons output from the photon pair source; the apparatus being configured to: separate the signal and idler photons using the at least one said photon optical property; and, direct at least one photon of the photon pair to be incident upon the medium under test; and, output the photon pair for detection.

The first aspect may be modified in any suitable way as disclosed herein including but not limited to any one or more of the following.

The apparatus may be configured such that the photon pair source is configured to: generate: signal photons having a wavelength within a first range of signal wavelengths; and, idler photons having a wavelength with a first range of idler wavelengths; output: signal photons having a wavelength within a second range of signal wavelengths that is narrower than the first range of signal wavelengths; and, idler photons having a wavelength within a second range of idler wavelengths that is narrower than the first range of idler wavelengths.

The apparatus may be configured such that the photon pair source is phase matched.

The apparatus may be configured such that the tuning means is configured to change the second range of idler wavelengths and the second range of signal wavelengths.

The apparatus may be configured such that the tuning means is configured to thermally tune the source to change the wavelengths of the signal and idler photons output from the photon pair source.

The apparatus may be configured such that the means configured to tune the photon pair source is configured to provide electrical current to the photon pair source to change the wavelengths of the signal and idler photons output from the photon pair source.

The apparatus may further comprise a signal-idler photon splitter configured to: receive the photon pair; and, separate the photon pair by causing: one of the photons of the photon pair to propagate along a first optical path; the other photon of the photon pair to: propagate along a second optical path different to the first optical path; and, be incident upon the medium under test.

The apparatus may comprise at least one light detector configured to detect the photon pair.

The apparatus may comprise: a first light detector arranged to detect photons propagating along the first optical path; and, a second light detector arranged to detect photons propagating along the second optical path.

The apparatus may be configured such that: the second optical path is further configured to receive the said other photon after interacting with or being operated upon by the medium under test; the second light detector arranged to detect the said other photon after interacting with or being operated upon by the medium under test.

The apparatus may be configured such that: the second optical path is further configured to receive the said other photon after passing through the medium under test; the second light detector is arranged to detect the said other photon after passing through the medium under test.

The apparatus may further comprise an electronic comparator, wherein: the first and second light detectors are each configured to generate corresponding first and second electrical signals upon detection of a photon from the photon pair; the comparator is configured to: receive the first and second electrical signals; and, output an output count signal based upon the receiving of at least one of the first and second electrical signals.

The apparatus may further comprise an optical filter configured to: receive pump photons and the converted photon pair; filter the pump photons.

The apparatus may be configured such that: the signal photon has an orthogonal polarisation to the idler photon; and, the signal-idler photon splitter comprises a polarisation splitter.

The apparatus may be configured such that the photon pair source is configured to convert at least one pump light photon into a signal and idler photon pair using a $^2$nonlinear optical process.

The apparatus may be configured such that the $^2$nonlinear optical process is spontaneous parametric down conversion.

The apparatus may be configured such that the photon pair source comprises a collinear phase matched crystal.

The apparatus may be configured such that the photon pair source comprises a circulating optical resonator.

The apparatus may be configured such that the circulating optical resonator is an integrated optic resonator.

The apparatus may be configured such that: the apparatus comprises an integrated optic waveguide configured to receive and guide the pump light; and, the circulating optical resonator is optically coupled to the integrated optic waveguide such that at least a portion of pump light within the integrated optic waveguide is coupled into the circulating optical resonator.

An apparatus may be configured such that the photon pair source is configured to convert at least one pump light photon into a signal and idler photon pair using a $^3$nonlinear optical process.

An apparatus may be configured such that the $^3$nonlinear optical process is four wave mixing.

According to a second aspect of the present invention, there is provided a spectroscopy method for measuring an optical property of a medium under test; the method comprising the steps of: converting at least one pump light photon into a signal and idler photon pair using a photon pair source; the signal and idler photons being distinguishable from each other by at least one photon optical property; outputting the signal and idler photon pair from the photon pair source; separating the signal and idler photons using the at least one said photon optical property; directing at least one photon of the photon pair to be incident upon the medium under test; detecting at least the one of the photons of the photon pair; tuning the photon pair source to change the wavelengths of the signal and idler photons output from the photon pair source.

The second aspect may be modified in any suitable way as disclosed herein including but not limited to any one or more of the following.

The method may further comprise the steps of: splitting the photon pair so that: one of the photons of the pair propagates along a first optical path to be detected by a first detector; the other photon of the photon pair: propagates along a second optical path to be: incident upon the medium under test; and then subsequently be, detected by the second detector.

The method may comprise the steps of: generating a first electrical signal when the first detector detects one of the photons of the photon pair; generating a second electrical signal when the second detector detects the other photon of the photon pair; comparing the presence of the first and second electrical signals generated from detecting one or more of the photons from the photon pair to determine the optical property of the medium under test.

According to a third aspect of the present invention, there is provided a spectroscopy apparatus for measuring an optical property of a medium under test by detecting one or more photons of a photon pair; the apparatus comprising: a photon pair source configured to: receive pump light; and, convert at least one pump light photon into a wavelength non-degenerate signal and idler photon pair; the signal and idler photons being distinguishable from each other by at least one photon optical property; output the signal and idler photon pair; a means configured to tune the photon pair source to change the wavelengths of the signal and idler photons output from the photon pair source; the apparatus being configured to: direct at least one photon of the photon pair to be incident upon the medium under test; and, the apparatus further comprising: a detector configured to: detect the signal and idler photons; discriminate between the signal and idler photons using the at least one photon optical property.

The third aspect may be modified in any suitable way as disclosed herein including but not limited to any one or more of the optional features listed above for the first aspect.

According to a fourth aspect of the present invention, there is provided a spectroscopy apparatus for measuring an optical property of a medium under test by detecting one or more photons of a photon pair: the apparatus comprising: an integrated optic photon pair source configured to: receive pump light; and, convert at least one pump light photon into a wavelength non-degenerate signal and idler photon pair; the signal and idler photons being distinguishable from each other by at least one photon optical property; output the signal and idler photon pair; the apparatus being configured to: separate the signal and idler photons using the at least one said photon optical property; and, direct at least one photon of the photon pair to be incident upon the medium under test; and, output the photon pair for detection.

The fourth aspect may be modified in any suitable way as disclosed herein including but not limited to any one or more of the following.

The apparatus may be configured such that the photon pair source is configured to convert at least one pump light photon into a signal and idler photon pair using a $^3$nonlinear optical process.

The apparatus may be configured such that the $^3$nonlinear optical process is four wave mixing.

The apparatus may be configured such that the photon pair source comprises a silicon optical waveguide.

The apparatus may be configured such that the photon pair source comprises a circulating optical resonator.

The apparatus may be configured such that: the apparatus comprises an integrated optic waveguide configured to receive and guide the pump light; and, the circulating optical resonator is optically coupled to the integrated optic waveguide such that at least a portion of pump light within the integrated optic waveguide is coupled into the circulating optical resonator.

The apparatus in any of the aspects may further comprise a first integrated optic filter configured to: receive pump, signal and idler photons from the photon pair source; and, separate at least one of the signal photons and/or idler photons from the pump photons such that the said signal photons and/or idler photons are output into a different output optical path to the pump photons.

The apparatus in any of the aspects may be configured such that the first integrated optical filter comprises a one or more circulating optical resonators.

The apparatus in any of the aspects may be configured such that the first optical filter comprises a one or more output waveguides, wherein each output waveguide is configured to couple light out of a different one of the one or more optical resonators.

The apparatus in any of the aspects may be configured such that each output waveguide is configured to input light into a further one of the one or more circulating optical resonators.

The apparatus in any of the aspects may be configured such that each of the one or more circulating optical resonators is configured to comprise a resonance wavelength substantially the same as the at least one of the signal and idler wavelengths.

The apparatus in any of the aspects may be configured such that each of the one or more circulating optical resonators is configured to comprise a resonance wavelength substantially the same as the pump wavelength.

The apparatus in any of the aspects may further comprise a second integrated optic filter configured to separate the signal and idler photons into different output optical paths.

BRIEF DESCRIPTION OF THE DRAWINGS

Embodiments of the present invention will now be described in detail with reference to the accompanying drawings, in which:

FIG. 14 shows another further example of a pump light rejection filter.

DETAILED DESCRIPTION

A spectroscopy apparatus and method are presented herein.

Figure 1:
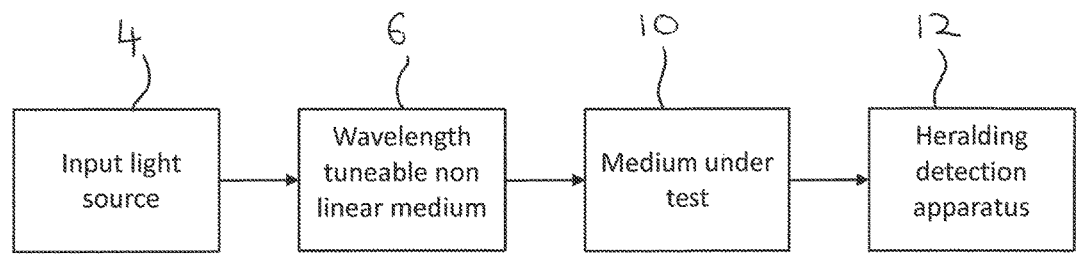
FIG. 1 shows a block diagram schematically showing an example of the flow of photons in a spectroscopic apparatus as described herein.
Figure 2A:
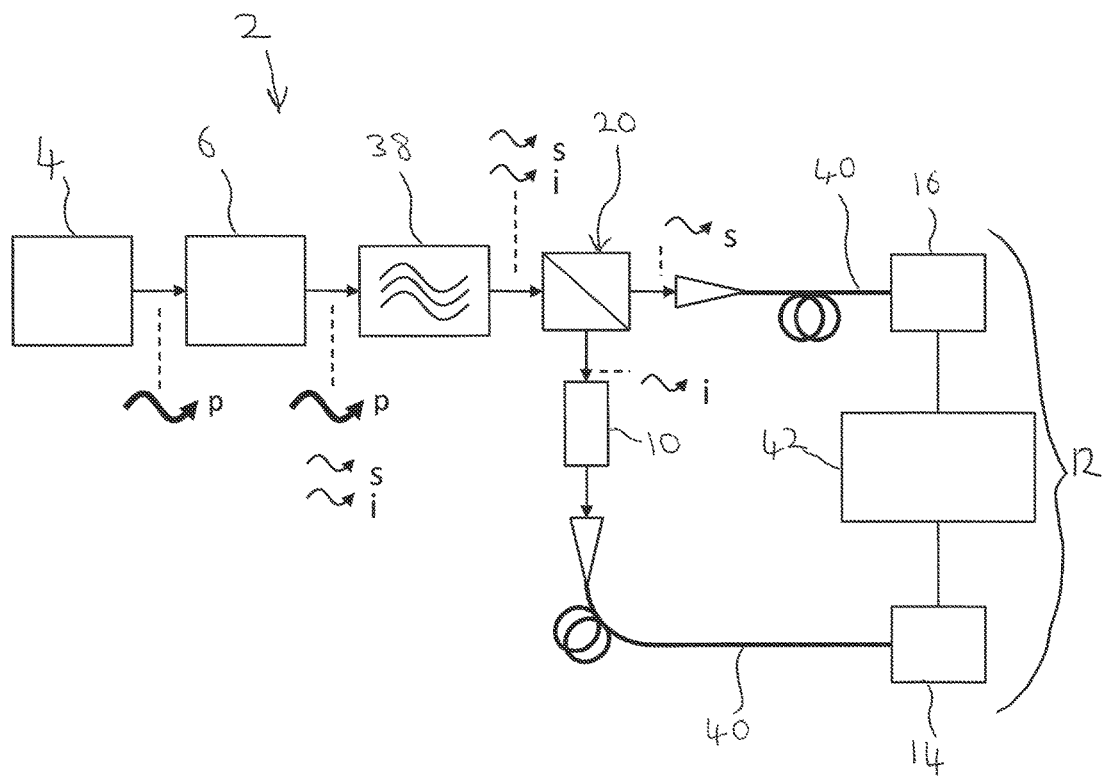
FIG. 2a shows a schematic diagram of an example of a spectroscopy apparatus as described herein wherein an idler photon is incident upon a medium under test.
Figure 2B:
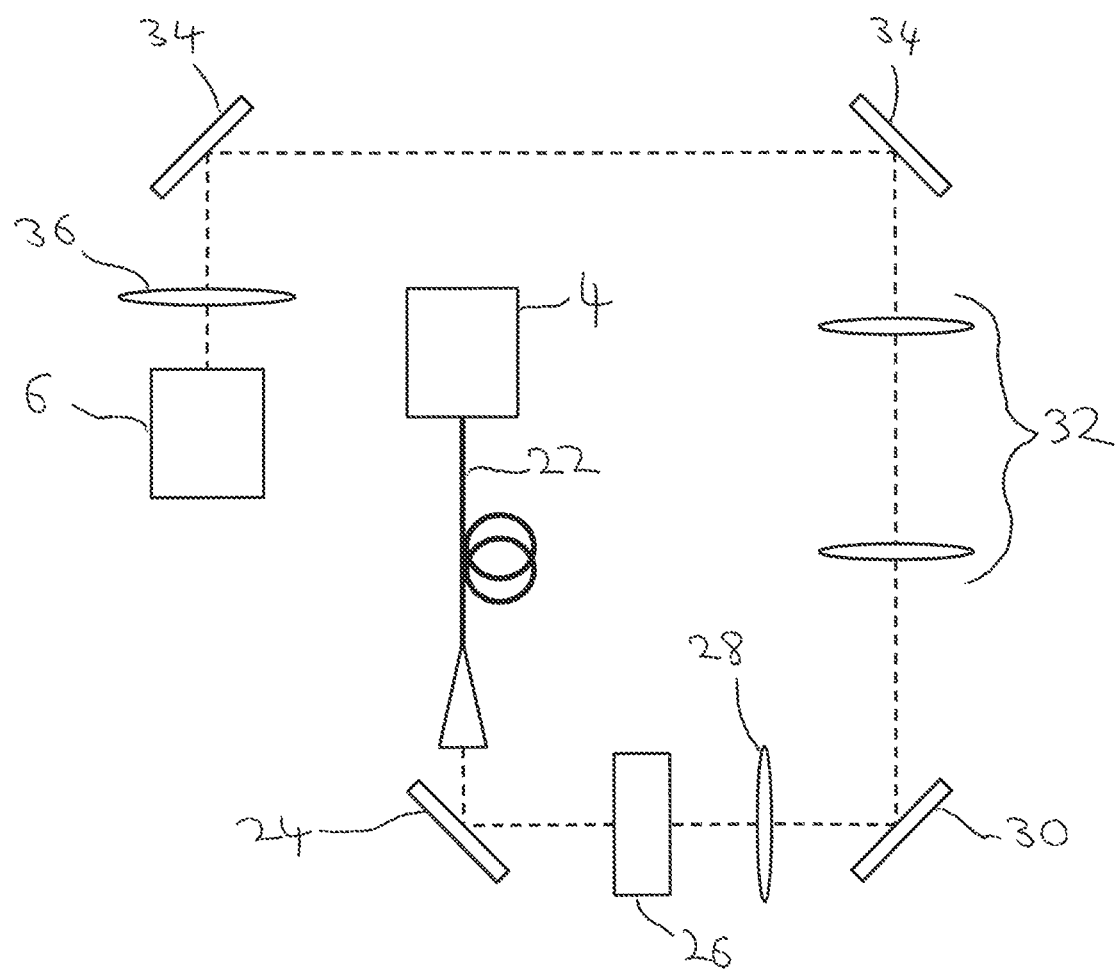
FIG. 2b shows a schematic diagram of an example of components for inputting light from the pump to the photon pair source.

FIG. 1 shows the basic operating principle of conducting spectroscopy using the spectroscopy apparatus 2 described herein. An example of a spectroscopy apparatus is shown in FIGS. 2a and 2b.

Operation

The spectroscopic method uses an input light source 4 (also referred to as a 'pump') that inputs light (pump photons) to a photon pair source 6. The photon pair source 6 converts pump photons into signal and idler photon pairs. The photon pair source 6 is, in some of examples described herein, tuneable so that the wavelength of the signal and idler photons can be changed by application of a tuning means 8. At least one of the signal and idler photons is made incident upon the medium under rest 10. A heralding detection apparatus 12 is used to detect any signal and idler photons output from the spectroscopy apparatus 2, wherein at least one of the photons of the pair has either interacted with or been operated upon by the medium under test 10.

By generating correlated signal and idler photons, the apparatus 2 may be set-up to direct one of the photons, for example the idler photon of the pair, to a first photon detector 14 whilst the other (the signal photon) is directed to a second photon detector 16. This is done deterministically using a component that separates the photons by virtue of a photon's optical property that differentiates the signal and idler photon. One of the photons of the pair, for example the idler photon, is made to be incident upon the medium under test 10. The photon incident upon the medium under test 10 may interact with or be operated on by the medium under test. For example an interaction may be the photon being absorbed, whereas a photon being operated upon by the medium under test 10 may be any operation/effect that changes the momentum of the photon, for example passing through or being reflected by the medium under test 10. The apparatus 2 is configured to direct the idler photon to the medium under test 10 and then direct the idler photon, after being incident upon the medium under test 10, to the first photon detector 14.

The photon pair generation process allows for a spectroscopy measurement that allows for the knowledge that an idler photon has been generated (and may be incident upon the first detector 14) if a signal photon is successfully detected at the second detector 16. This detection system is referred to throughout as a heralded detection apparatus 12 wherein the second detector 16 is a heralding detector because the presence of the signal photon being detected on the second detector 16 heralds the expectation of the idler photon being detected on the first detector 14. Either the detection rate or intensity registered on the first detector 14 is used directly with the detection rate or intensity on the second detector 16; or the two detectors are used together to detect photon pairs in coincidence. The photon pair source 6 with its photon pair being detected in this way is known as a heralded photon source. In other words, heralded single photon sources are probabilistic two photon sources from whom the pair is split and the detection of one photon heralds the presence of the remaining one.

By using the heralding detection apparatus 12 to detect the presence of plurality of photon pairs (i.e. by at least detecting one of the photons of the pair) a record of the number of photon pairs can be created. The record providing detection incidences when: A) only the signal photon is detected; B) only the idler photon is detected; and C) where both idler and signal photons are detected (i.e. coincidences). By comparing these data records, one can determine the relative losses between the two optical paths that the photons of the pair take to their respective detectors 14, 16.

If the average optical paths losses that the signal and idler photons encounter to their respective detectors 14, 16 (without the presence of the medium under test 10) are similar then the extra losses encountered in the optical path of the idler photon are taken to be the losses experienced by the idler photon that is incident upon the medium under test 10.

If no idler photon is detected at the first detector 14 then that photon has been lost somehow, for example being absorbed by the medium under test 10.

Using correlated photon pairs and heralding detection allows the spectroscopy apparatus to utilise the statistical uncertainty of measuring single photon Fock stares. As described above, a normal laser source has a Poissonian variance in the number of photons in a beam incident upon the detector at any given time which gives rise to shot noise. The noise of a heralded photon source however follows a Binomial distribution. Since the standard deviation of a Binomial distribution is smaller than that of a Poisson distribution, we have less uncertainty on our estimate of the absorbance, per photon (i.e. light intensity) used in the measurement. The spectroscopy apparatus described herein therefore allows for spectroscopy measurements to be performed below the shot noise limit. The sub-shot noise behaviour of the spectroscopy apparatus is discussed in detail below making reference to a spectroscopy transmission measurement.

When determining the transmissivity of a medium under test, it is desirable to determine the value of a probability type transmissivity parameter $\eta_P$ by measuring the reduction of light intensity from an already known intensity value $<N_{in}>$ at the input, to $<N_{out}>$ at the output after passing through a medium under test 10.

When a classical coherent laser source with Poissonian photon number statistics is used to probe a medium under test 10, with $\nu$ being the number of repetitions of the measurement, and with input intensity $\overline{N}$, the limit to the precision for estimating transmissivity $\eta_P$ is:

$$\Delta \eta_P = \sqrt{\frac{\eta_P}{\nu \overline{N}}} \quad [1]$$

Correspondingly, when single photon Fock states are used instead of a classical coherent laser source, the limit to the precision for estimating transmissivity $\eta_P$ is:

$$\Delta \eta_P = \sqrt{\frac{\eta_P(1-\eta_P)}{\nu \overline{N}}} \quad [2]$$

This is the fundamental quantum limit to precision for estimating $\eta_P$. Therefore using Fock states improves the uncertainty in measuring the transmissivity parameter $\eta_P$ of a medium under test by a factor of $\sqrt{1-\eta_P}$ (assuming 100% efficient photon detectors). The dimensionless factor of improvement in the uncertainty in measuring the transmissivity parameter $\eta_P$ is termed as the 'quantum advantage', thus using Fock states provides a theoretical quantum advantage of reducing the uncertainty by a factor of $\sqrt{1-\eta_P}$.

When using the spectroscopy apparatus 2 to determine an optical property of a medium under test 10, multiple measurements of photon pairs are typically made for each wavelength data point so that a statistically meaningful result can be determined. For example, to determine the absorbance of the medium under test 10 using a first idler photon wavelength, multiple photon pairs are measured for that particular wavelength before the apparatus 2 is tuned to output a different idler wavelength.

In some circumstances the sub shot noise performance that arises from using single photon Fock states requires the use of photon coincidence counting.

Coincidence counting requires knowing when the detection of the corresponding photon of the pair is going to happen when detecting the other photon of the pair. For example by knowing the optical paths lengths, hence the times the photons take getting to their respective detectors 14, 16. If a signal photon is detected and an idler photon is detected with this information then a coincidence count is made because it is known that a 'photon pair' has been detected.

Generally, the optical path that the signal photon takes from the photon pair source 6 to its corresponding detector 16 has an optical transmission of N % (hence a 100-N % loss of photons that travel along the optical path from the photon pair source 6 to the detector 16) whilst the optical path that the idler photon takes from the photon pair source 6 to its corresponding detector 14 has an optical transmission of M % (hence a 100-M % loss). If the following inequality applies:

$$N\% + M\% \geq 100\% \qquad [3]$$

then the spectroscopy apparatus 2 can still obtain sub shot noise measurements when simply measuring the total number of signal and idler photons during a measurement period without any coincidence counting. Thus, if efficiency is high enough, you can take the single photon events (or intensity) collected over a longer period of time (the whole experiment time if you like) on each of the two detectors and compare them, not through coincidence logic.

However, if the total optical losses in the optical paths that the signal and idler photons take between the output of the photon pair source 6 and the corresponding detectors 14, 16 is less than 100%, i.e.

$$N\% + M\% < 100\% \qquad [4]$$

then sub shot noise performance of the spectroscopy apparatus 2 cannot be attained merely by counting the total number of photons detected by each detector 14, 16 in a particular measurement period. Some form of deterministic knowledge within the spectroscopy measurement is required such that the detection or lack of detection of a photon in one detector (monitoring a first optical path) directly indicates the successful or unsuccessful transmission of a photon pair along one optical path when the other photon of the pair is detected by a detector 14, 16 monitoring the other optical path. One such mechanism for achieving this is to use coincidence counting. Another mechanism is to utilise a gating set-up described later. Thus if the efficiency is not high enough, one must 'detect pairs' to attain sub-shot noise performance. 'Detecting pairs' implies within a coincidence window two detectors fire, this double event is a 'pair detection', also called a coincidence detection.

Spectroscopy Apparatus

The spectroscopy apparatus 2 is suitable for measuring an optical property of a medium under test 10. Preferably the optical property is the light absorption of the medium under test 10. The spectroscopy apparatus 2 determines the wavelength dependence of the particular optical property of the medium under test 10.

The apparatus 2 comprises a photon pair source 6 configured to receive pump light and convert at least one pump light photon into a wavelength non-degenerate signal and idler photon pair.

Pump light may be input from any source 4 in principle, but is preferably a monochromatic coherent source such as a laser. The pump source 4 may be part of the spectroscopy apparatus 2, however in some examples the pump source 4 may not be part of the apparatus 2 described herein.

The photon pairs are generated using one or more non-linear optical phenomena such as, but not limited to Spontaneous Parametric Down Conversion (SPDC) or Four Wave Mixing (FWM). The signal and idler photons output from the photon pair source are distinguishable from each other by at least one photon optical property.

Photon optical properties may include any optical property that can be used to distinguish one photon from another, for example, polarisation, wavelength, or the time/spatial position of one photon relative to the other photon.

In one aspect, the apparatus 2 further comprises a means 18 configured to tune the photon pair source 6 to change the wavelengths of the signal and idler photons output from the photon pair source 6. This allows the apparatus 2 to scan the wavelength dependence of the optical property of the medium under test 10. By directly tuning the photon pair source 6 to output different signal/idler wavelengths, the spectroscopy apparatus 2 provides a simpler set-up than other known set-ups that use devices such as monochromators to wavelength scan.

The apparatus 2 may be configured to separate the signal and idler photons using the at least one photon optical property. This may, in principle, be accomplished using different components such as a splitter 20, (for example a polarisation splitter or a wavelength splitter). The separation may be achieved by the photon pair source 6 itself, which for some nonlinear effects can be configured to output different wavelength photons at different angles of propagation away from the photon pair source 6. The separation of the photons of the photon pair may be along physically different optical paths or alternatively, separated in time along the same optical path.

In some examples, the apparatus 2 may not separate the signal and idler photons before reaching the heralding detection apparatus 12. In such examples the signal and idler photons may be distinguished from each other at the detector 12.

The apparatus 2 is also configured to direct at least one photon of the photon pair to be incident upon the medium under test 10. This may be the signal or idler photon or both. The one or more photons of the pair that are incident upon the medium under test may be arranged to be detected if they are transmitted through the medium and/or reflected from the medium, depending on the spectroscopy measurement.

The apparatus 2 is configured to output the photon pair for detection. In principle, the apparatus may be configured to output the signal and idler photons along separate optical paths to be detected by separate optical detectors 14, 16 or the same optical detector.

The apparatus 2 may include the one or more optical detectors 14, 16 used to detect the photons, however in some examples the detectors may not be part of the apparatus 2 described herein.

The spectroscopy apparatus 2 and its operation will now be described with reference to examples. The following examples are not intended to be limiting and may be modified in a suitable way described herein.

FIG. 2a shows a preferred example of a spectroscopy apparatus 2 as described herein. A pump source 4 inputs continuous wave monochromatic laser light into the photon pair source 6. The pump light can be introduced from the laser into the photon pair source 6 by any suitable means including using optical fibres, integrated optic components and/or other bulk optic components. The set-up in FIG. 2b, described below, shows one example of doing this using a solid state blue diode laser emitting 404 nm light.

The set-up in FIG. 2b shows the output of the pump source 4 being coupled into a single mode optical fibre. Pump light is then output from the end of the optical fibre, collimated and reflected off a mirror before being input into a half wave plate 26 and an optical filter 28 to remove any unwanted pump laser wavelengths output from the pump laser, for example any wavelengths at ~800 nm. The collimated pump beam then reflects off a further mirror 30 and passes through two spherical lenses 32 (f=50 mm, f=200 mm) to expand the beam diameter from ~700 μm to ~2.1 mm. The expanded beam is then reflected off a further two mirrors 34 before being focussed by a further spherical lens 36 (f=200 mm) into the photon pair source 6, which is FIG. 2b is a non-waveguiding periodically poled potassium titanyl phosphate crystal (PPKTP). The lens configurations in FIG. 2b are used to obtain a laser spot size of ~25 μm in the centre of the crystal to maximise the number of photon pairs produced.

In principle, any set-up could be used to introduce pump light into the photon pair source 6. The set-up in FIG. 2b can be modified in any suitable way, for example by having some or all of the components in-line, thus negating the need for some or all of the mirrors, using different lenses and/or number of lenses, using a different filter 28 to remove unwanted pump wavelengths (for example those occurring in unwanted sidebands) or the removal of this filter, using a different pump source 4.

Returning to FIG. 2a, the pump light enters the photon pair source 6. Within the photon pair source 6, one or more pump light photons are converted to a wavelength non-degenerate signal and idler photon pair. The wavelength non-degenerate photon pair have different wavelengths wherein the energy (hence wavelength) of the signal and idler photons add up to the total energy of the one or more pump photons used to create the photon pair.

This conversion of one or more pump photons to a photon pair is accomplished using any phenomena in principle. Known techniques and principles for generating a photon pair utilise nonlinear optical phenomenon such as SPDC of FWM.

For a photon pair source 6 using SPDC where one pump photon is annihilated and converted to a photon pair, both signal and idler photons have a lower energy, hence longer wavelength than the pump photon.

For a photon pair source 6 using FWM where two pump photon are annihilated and converted to the photon pair, the signal photon will typically have a larger energy (hence shorter wavelength) than a single pump photon whereas the idler photon will typically have a lower energy (hence longer wavelength) than a single pump photon.

In the example shown in FIG. 2a, a non-waveguiding periodically poled potassium titanyl phosphate crystal (PPKTP) is used as the photon pair source 6. The photon pair source 6 generates orthogonally polarised wavelength correlated signal and idler photon pairs using type II SPDC. Although the material of the photon pair source 6 allows for a wide bandwidth of possible signal/idler photon pairs the periodic polling phase matches the crystal so that only signal and idler photons within a finite bandwidth are output from the source 6. The photon pair is also collinear in that they are output along the same physical output path. The photon pair source 6 typically outputs multiple photon pairs as well as pump light photons that do not get converted into photon pairs.

After being output from the photon pair source 6, the photon pairs and unconverted pump light photons are input into an optical filter 38 that filters out the pump light photons and allows the signal and idler photons to pass through the filter 38.

After being output from the optical pump light filter 38, the photon pairs are input into a polarisation splitter 20 which directs (by reflection) photons of one polarisation along one optical path whilst allowing photons of the orthogonal polarisation to pass through the splitter 20 and follow a different optical path. In FIG. 2a, the idler photon has an e-polarisation whilst the signal photon has an o-polarisation. The polarisation splitter 20 in FIG. 2a reflects the idler photon towards the medium under test 10 and transmits the signal photon.

The idler photon is then made incident upon the medium under test 10. The set-up shown in FIG. 2a is configured to measure the absorbance of the medium under test 10; therefore the apparatus is configured to capture idler photons that successfully pass through the medium under test 10 without being absorbed.

The signal photons exiting the polarisation splitter 20 and the idler photons successfully exiting the medium under test 10 are output to optical detectors 14, 16. In FIG. 2a this is done by focussing the photons into separate optical fibres 40 wherein each optical fibre delivers the photons to be incident upon the optical detectors 14, 16.

The optical detectors 14, 16 in FIG. 2a are single photon counting optical detectors. Both detectors 14, 16 are connected electronically to a coincidence counting electronics 42 that registers when photons of the same pair are detected.

The optical paths of the signal and idler photons from their output of the photon pair source 6 to the corresponding detectors 14, 16 are ideally made to be as loss-less and as identical as possible (apart from the medium under test 10 being in the path of the idler photon).

Phase Matching

As described previously, some photon pair sources 6 generate signal photons having a wavelength within a first range of signal wavelengths and idler photons having a wavelength with a first range of idler wavelengths. The wavelength ranges generated by the photon pair source may be broad (hence a large bandwidth). In such a situation the photon pair source can be configured to allow a narrow range of wavelength to be output from the source 6 such that the signal photons have a wavelength within a second range of signal wavelengths that is narrower than the first range of signal wavelengths and the idler photons having a wavelength within a second range of idler wavelengths that is narrower than the first range of idler wavelengths. One mechanism for achieving this is to phase-match the photon pair source 6.

A phase matched source has a configuration where only certain wavelengths of converted light propagating through the photon pair source 6 constructively interfere to produce an output from the source. A phase matched photon pair source 6 typically outputs wavelengths within a particular bandwidth. The photon pair wavelengths generated by the photon pair source 6 outside of this bandwidth destructively interfere and are not output by the photon pair source 6.

Phase matching may be accomplished by using periodic poling as described above for the example in FIG. 2a where a periodically poled potassium titanyl phosphate crystal (PPKTP) photon pair source 6 is used.

Measuring and Tuning

When sufficient measurements of the medium under test 10 have been made at the particular wavelength of idler photon, the photon pair source 6 is tuned by the tuning means to change the wavelength of the photon pairs output by the photon pair source 6. In the example in FIG. 2a, this is achieved by thermally tuning the PPKTP photon pair source 6. Inducing a temperature change within the periodically poled photon pair source changes the refractive index of the PPKTP hence changes the photon pair wavelengths satisfying the phase matching condition.

A calibration of the converted signal/idler wavelength may be made before the medium under test 10 is inserted into the optical path of the idler photon. Such a calibration would detect the wavelengths of the signal/idler photons output by the photon pair source 6 as a function of photon pair source tuning. For example, with a spectroscopy apparatus 2 shown in FIG. 2a, the detectors 14, 16 may be substituted by wavelength dependent detection apparatus that determined the wavelengths of converted photons that are propagating along the output optical paths. The medium under test 10 could be removed for this calibration. The photon pair source 6 may be tuned by incrementally raising the temperature of the source 6, changing the phase matching condition, hence the signal/idler output wavelengths. A record of photon pair source temperature and signal idler wavelength could be made. Such a record would then be used by the spectroscopy apparatus 2 when measuring the medium under test 10, i.e. by setting a particular temperature, the wavelength of the idler photon incident upon the medium under test would be already known.

Results

An experimental set-up of a spectroscopy apparatus was made similar to that shown in FIGS. 2a and 2b.

Data was obtained for measuring the transmission of an interference filter as a function of wavelength. The data was partitioned into trials, for which the transmission estimate was computed for each trial. The variance of the estimates was then computed over the trials for each wavelength setting. This gave the Fisher Information: FI~1/Var($\eta$).

This calculation was repeated a number of times and the standard deviation of the Fisher Information for each wavelength value was used to compute error bars. Note that the Fisher Information in this calculation is the 'Fisher Information per detected photon' and that the Fisher Information itself of this measurement is dependent on the transmission parameter that we are estimating (and therefore the wavelength of light passing through the filter). The Fisher Information per photon detected for the two cases (Fork states and coherent states) are given respectively as:

$$FI_{Fock} = \frac{1}{\eta - \eta^2} \quad [5]$$

$$FI_{Coherent} = \frac{1}{\eta} \quad [6]$$

Where $\eta$ is the transmission parameter being estimated.

Figure 3:
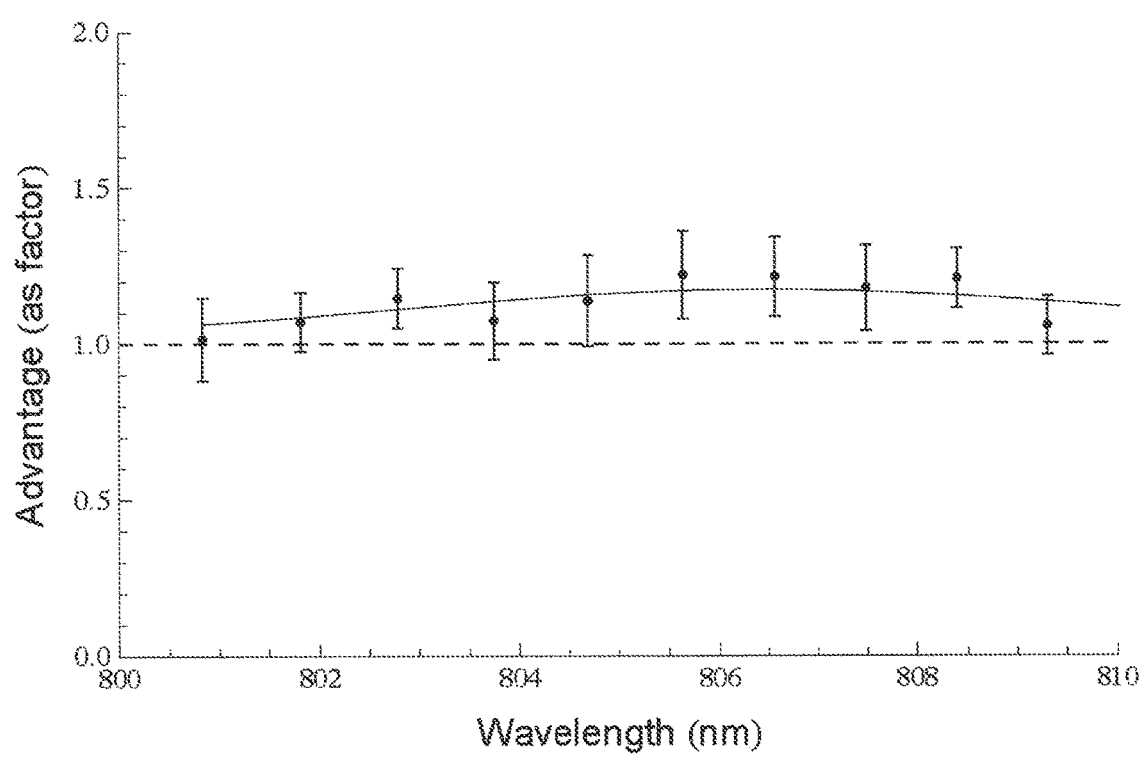
FIG. 3 shows results for a spectroscopy apparatus similar to that shown in FIGS. 2a and 2b.

FIG. 3 shows the quantum advantage obtained by dividing the Fisher Information obtained experimentally by the theoretical Fisher Information for a coherent state (i.e. the best laser behaving in the most stable way so that the classical experiment is shot-noise limited). This gives an observable quantum advantage as a factor. Having an advantage of 1 means the measurement results are on the shot noise limit, an advantage of <1 means the measurement results are worse than the best possible classical experiment and >1 means the measurement results are getting sub-shot noise performance. We can see in several cases in FIG. 3 that the error bars clear the shot noise line (the dashed line at the advantage=1 point), indicating a quantum advantage.

The example shown in FIGS. 2a and 2b are merely one example of implementing a spectroscopy apparatus 2 as described herein. The principles and features of the example described above and shown in FIGS. 2a and 2b may be modified in any suitable way using features described herein.

The following describes other examples of spectroscopy apparatus 2 and ways in which the apparatus 2 may be changed or modified.

General Set-Up in principle, the spectroscopy apparatus 2 may be formed using any number of components/devices or types of components devices. For example, the spectroscopy apparatus 2 may be formed from bulk optical components. Additionally or alternatively, the spectroscopy apparatus 2 may be formed using fibre optic components and/or integrated optic components.

The apparatus 2 may be configured to direct the photons used in the apparatus 2 between different components (such as the pump source 4, photon pair source 6, pump filter 38, photon pair splitter 20 and detectors 14, 16) using any suitable optical arranged including any one or more of: arranging the component to direct photons via free space propagation, use of lenses, mirrors and other focussing or photon path directing components, waveguiding components such as optical fibres and integrated waveguides.

One preferred wavelength range of operation of the apparatus 2 is 1400-1700 nm (i.e. at least the signal/idler photons are all preferably within this wavelength range). Another preferred wavelength range is between 1500-1600 nm. Another preferred range would be 750 nm-850 nm, for example for functional near Infrared spectroscopy.

Photon Pair Source

The photon pair source 6 may be any photon pair source 6 that generates a signal and idler photon pair. The source may generate the photons using any mechanism including but not limited to any of a $\chi^2$ nonlinear optical process such as SPDC or a $\chi^3$ nonlinear optical process such as FWM. The signal and idler pair are non-degenerate by virtue of their wavelengths being different. Preferably the source 6 is a non-linear phase matched crystal. Preferably this crystal is periodically poled. The source may be a periodically poled material such as periodically poled potassium titanyl phosphate crystal (PPKTP). If the primary nonlinear process to generate photon pairs is FWM, then the photon pair source 6 may comprise an integrated optic waveguide 44 comprising a core material 46 suitable for generating photon pairs via FWM, for example a silicon core waveguide on a silica under-cladding 48 (also known as silicon on insulator) as exemplified in FIG. 11. The silicon under-cladding may be grown, deposited or otherwise formed on a substrate 50 such as a silicon substrate. In principle, any integrated optic material system could be used with a core being a photon pair source 6.

In some examples a circulating optical resonator structure 52 may be used, for example a ring resonator as described below.

The photon pair source 6 is preferably configured to generate, within the source 6, signal photons having a wavelength within a first range of signal wavelengths and idler photons having a wavelength with a first range of idler wavelengths but output signal photons having a wavelength within a second range of signal wavelengths that is narrower than the first range of signal wavelengths; and output idler photons having a wavelength within a second range of idler wavelengths that is narrower than the first range of idler wavelengths. This may be accomplished using any suitable means including phase matching.

When phase matching the photon pair source 6, any type of phase matching may be used including but not limited to: type 0 phase matching where the pump photons, signal and idler photons all have the same polarisation, type I phase matching where both the signal and idler photons have an orthogonal polarisation to the pump photons and type II where the pump and idler photons have the same polarisation whilst the signal photons are orthogonal to the pump photons.

If the signal and idler photons of the same pair have the same polarisation then the spectroscopy apparatus 2 needs to separate them using another photon optical property such as wavelength, for example using a wavelength filter. For example, if a type I phase matched photon pair source 6 was used, then the spectroscopy apparatus 2 in FIG. 2a could be modified so that the polarisation splitter 20 is replaced by a dichroic mirror.

The photon pair source 6 may be configured to output the photon pair collinearly (i.e. along the same output path) or non-collinearly (i.e. output with divergent optical paths). If the photon pair source 6 is non-collinear then the requirement for a separate component to separate the signal and idler photons may be negated.

Pump Light

The pump photons input to the photon pair source 6 may be generated by any suitable pump light source 4. Preferably the pump source 4 is a laser source outputting coherent monochromatic pump photons. The pump source 4 may output either pulsed or continuous wave light. The pump source 4 may be tuneable. In principle, the pump source 4 may output any photon wavelengths. If the photon pair source uses SPDC, or another nonlinear effect creating a signal and idler photon from a single pump photon, then a preferred range of pump wavelength would be 390 nm-450 nm, more preferably 402-406 nm. Such a range would be applicable for functional near-infrared spectroscopy. If the photon pair source uses four wave mixing or another nonlinear process using two pump photons to generate a signal/idler photon pair, then preferred pump photon wavelengths would be between 1200 nm-2000 nm, more preferably 1500 nm-1600 nm.

Optical Filter

The unconverted pump light output from the photon pair source filtered out before the detectors using any mechanism in principle. One or more pump filters 38 may be used. The one or more pump filters 38 may be disposed at any location in the optical paths of the signal/idler photons from the photon pair source 6 to the detectors 14, 16. Preferably the filter 38 comprises an optical bandpass characteristic.

Figure 12:
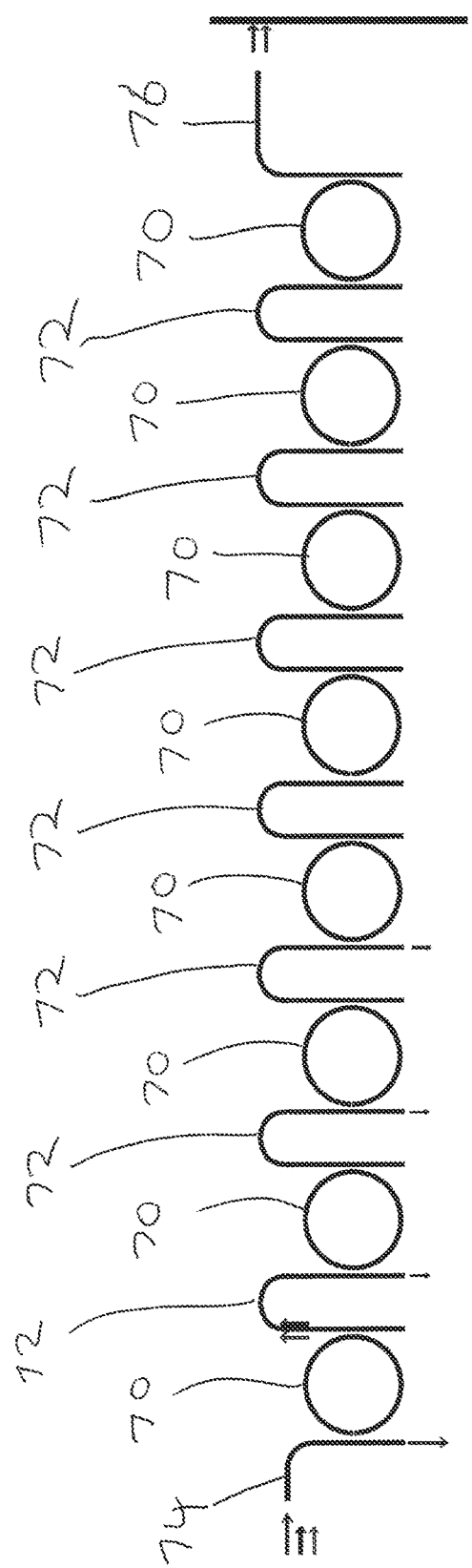
FIG. 12 shows an example of a pump light rejection filter.
Figure 13:
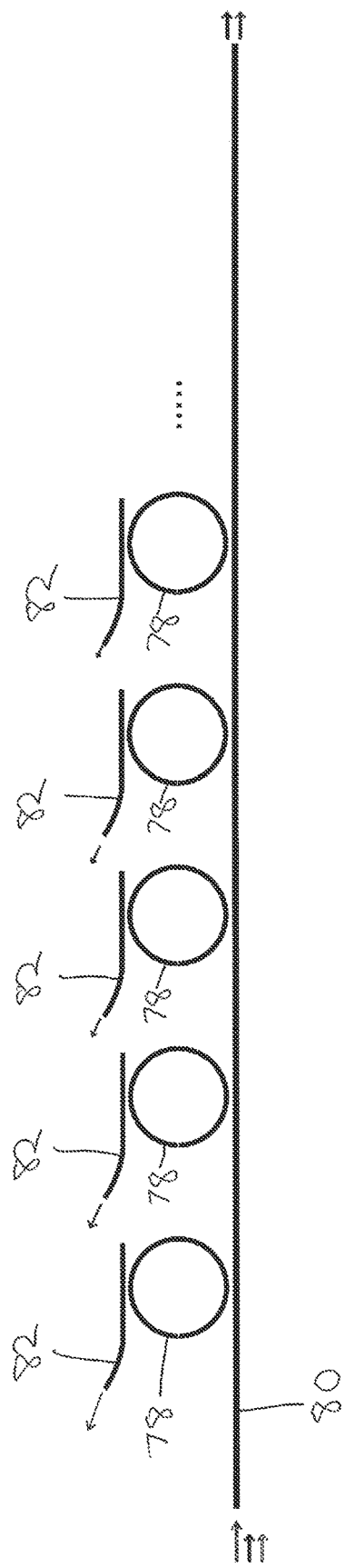
FIG. 13 shows a further example of a pump light rejection filter.

In one example the optical filtering of the pump light may be accomplished by filtering out the signal and idler photons into another optical channel. An example of this is shown for a ring resonator based spectroscopic apparatus 2 described below. FIG. 12-14 show examples of pump rejection filters for use with spectroscopy apparatus described herein.

Preferably the pump filter extinction should be between greater than 70 dB, more preferably 90-120 dB.

Medium Under Test

The medium under test 10 may be any medium in principle including a solid, liquid, gas or plasma. The optical property of the medium under test 10 (that is to be measured) is in principle any property of the medium that can be interrogated and determined using light, including any of, but not limited to, surface transmittance, reflectance or material absorption.

If the spectroscopy apparatus 2 were to measure the wavelength dependent reflectivity of a surface of a sample then the apparatus would be configured to direct the at least one photon of the pair onto the surface of the medium under test 10 and receive the said photon reflected by the surface (should it actually be reflected).

In principle, the medium under test 10 may be in the optical path of the signal photon, the idler photon or both.

Figure 4:
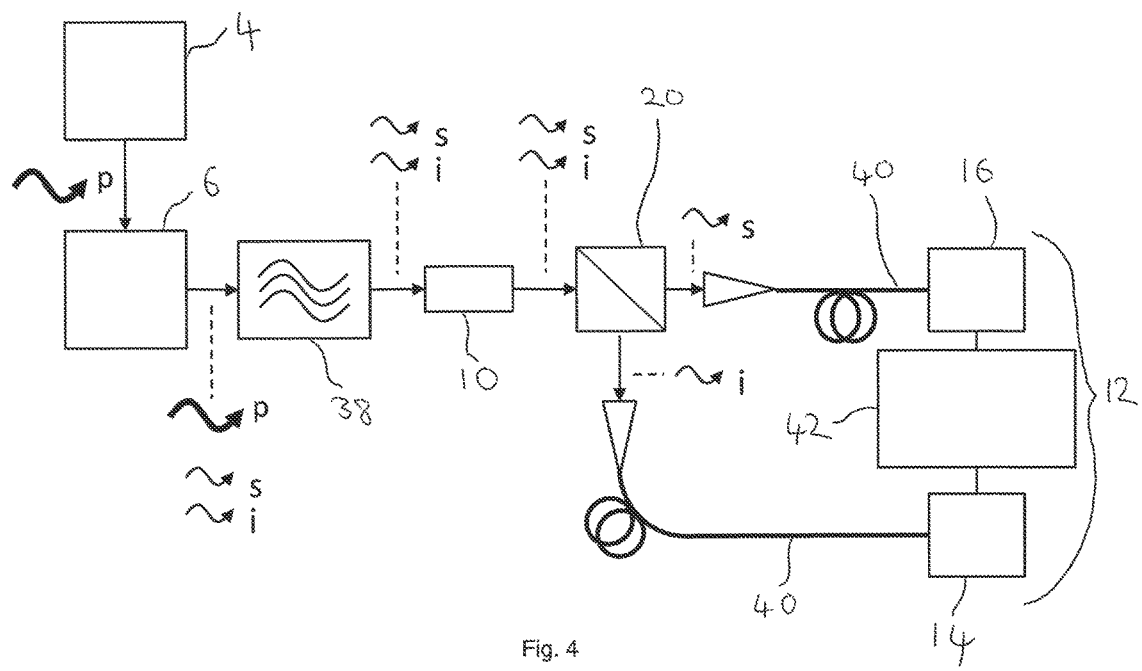
FIG. 4 shows a schematic diagram of an example of a spectroscopy apparatus as described herein wherein both a signal and idler photon are incident upon the medium under test.

FIG. 4 shows another example of a spectroscopy system, similar to that shown in FIG. 2a wherein the apparatus 2 is configured to pass both the signal and idler photon through the medium under test 10 and then separate them afterwards into two different optical paths using a polarisation beam splitter 20. In such a configuration, the spectroscopy apparatus 2 may derive information about the optical property of the medium under test 10 by comparing the relative count rates of each type of photon from the photon pairs. For example, the medium under test 10 may already be characterised for absorbance for longer wavelengths of ~600 nm, but no characterisation data exists for the shorter wavelengths at ~400 nm. By then obtaining relative absorbance measurements at ~600 nm and at ~400 nm using the photon pair, an absolute quantitative value of absorbance may be obtained for the shorter wavelengths at ~400 nm by using the existing 600 nm data and the new photon pair data.

Separation of Signal and Idler Photons

The signal and idler photons of the photon pair are distinguishable from each other by at least one optical property. This optical property may be wavelength and, in addition, may also be polarisation. The spectroscopy apparatus 2 is configured to determine which photon of the pair has been detected at a particular detector 14, 16. In FIGS. 2a and 4, two detectors 14, 16 are used and the photon pair is separated into two physically different optical paths using a polarisation splitter 20 before being incident upon their respective detectors 14, 16.

If the spectroscopy apparatus 2 were to use wavelength to separate such a photon pair, then a suitable wavelength sputter, could be used such as an edge filter or bandpass filter.

The splitter 20 used to separate the signal and idler photons may be tuneable. For example, if the splitter 20 was configured to use wavelength to split the photon pair, then this splitter could be tuneable to match any corresponding tuning of a phase matched photon pair source 6.

Figure 5:
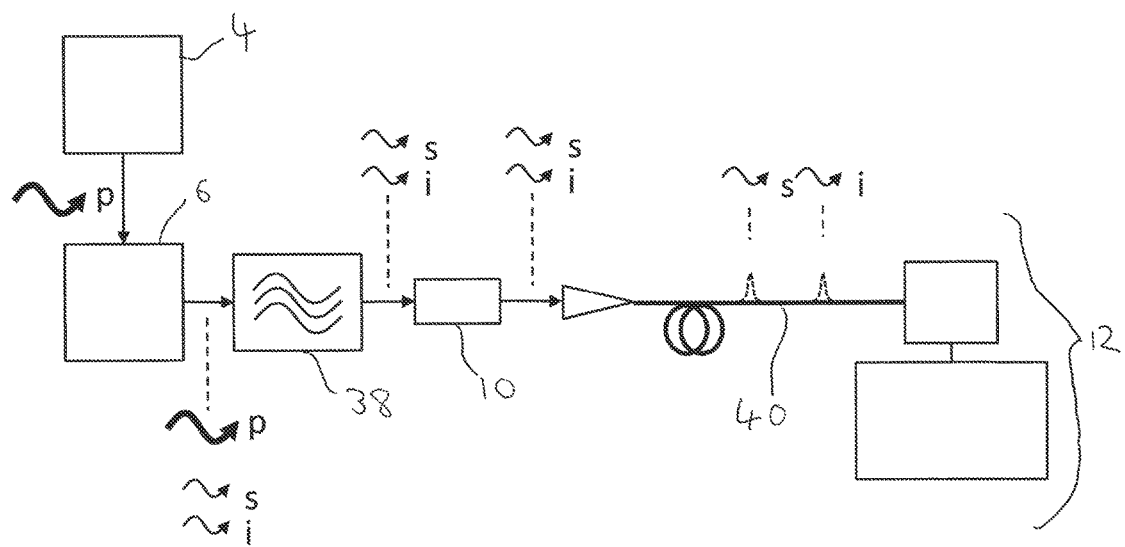
FIG. 5 shows a schematic diagram of an example of a spectroscopy apparatus as described herein, similar to FIG. 4, wherein both a signal and idler photon are incident upon the medium under test and wherein the signal and idler photons are separated in time before being detected by the same detector.

In other examples, for example in FIG. 5, the photons are separated in time along the same optical path. This may be achieved using any suitable means. For example in FIG. 5, the optical fibre 40 leading to the common detector may be a highly birefringent (Hi-Bi) fibre that has different group velocities for different polarisation modes. One of the photons of the pair will travel faster to the detector 12 than the other. The detector 12 can therefore determine when the next photon 'should' arrive based on the time difference in detection. The fibre 40 could additionally or alternative be highly wavelength dispersive fibre that had different group velocities for the different signal and idler wavelength.

Figure 6:
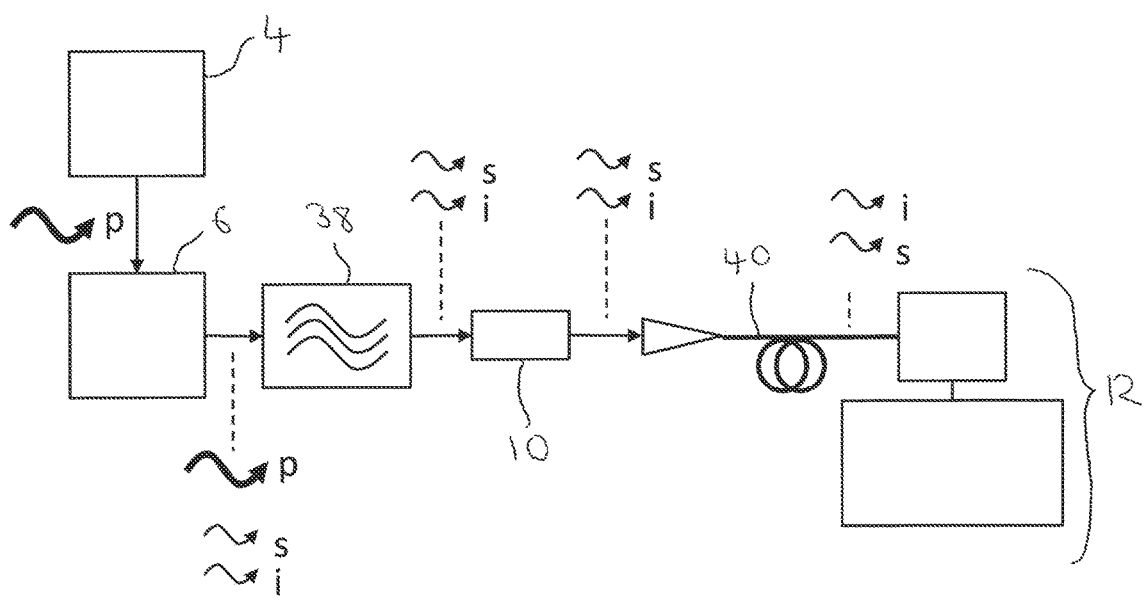
FIG. 6 shows a schematic diagram of an example of a spectroscopy apparatus as described herein wherein both a signal and idler photon are incident upon the medium under test and wherein the signal and idler photons are detected by the same detector, the detector configured to differentiate between the signal and idler photons.

FIG. 6 shows an example of a similar spectroscopy apparatus 2 wherein the signal and idler wavelengths are not separated, but instead are discriminated at the detector 12, for example a detector that could tell when a particular polarisation was incident upon it.

Tuning Means

The means 8 used to change the wavelength of the signal and idler photons output from photon pair source 6 may comprise any suitable tuning means 8 in principle, for example any one or more of, but not limited to thermal tuning means whereby the temperature of the photon pair source 6 is caused to change. Such a thermal tuning device 6 or element may be a heater strip adjacently contacting to the photon pair source 6 with electrical contacts to pass current along the heater strip, heat the strip and hence heat the photon pair source 6. Another tuning means 8 could be an oven or any other mechanism/device that imparts heat to the photon pair source 6. Likewise, the thermal tuning means 6 may additionally or alternatively cool the photon pair source.

Other tuning mechanisms 6 may be used including, but not limited to current injection into the photon pair source 6, mechanical tuning devices or devices or means using the Pockels effect.

Detectors

The spectroscopy apparatus 2 may be configured to output the signal and idler photons for detection wherein the detectors 12, 14, 16 do not form part of the spectroscopy apparatus 2. Alternatively one or more of the detectors 12, 14, 16 may comprise part of the spectroscopy apparatus 2.

The one or more detectors 12, 14, 16 used to detect the signal/idler photons may be any optical detector in principle that can generate an electrical signal from the absorption of a photon. Preferably the detectors 12, 14, 16 are single photon detectors.

The detectors 12, 14, 16 may be electronically coupled to comparator electronics 42 which registers coincidence counts as described above.

Figure 7:
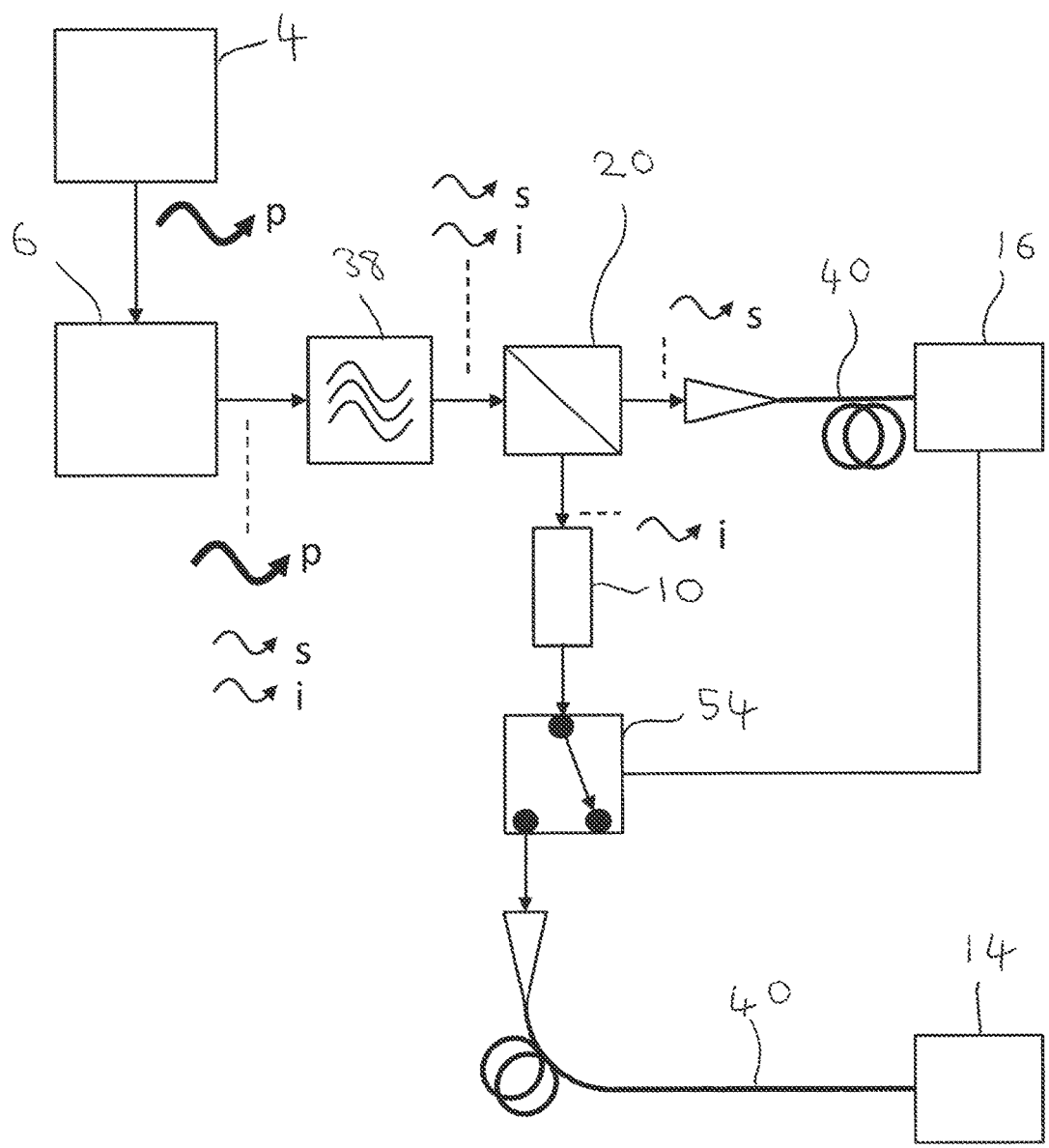
FIG. 7 shows a spectroscopy apparatus similar to that shown in FIG. 3 further comprising a gating switch.

The spectroscopy apparatus 2 may also comprise a gating mechanism 54 as shown in FIG. 7. When a signal photon is detected by the second detector 16, the resulting electrical signal is used to drive a gating optical switch 54 in the path of the idler photon. The gating switch 54 is nominally configured to direct idler photons away from the detector 14, however upon receiving a driving signal (resulting from the second detector 16 detecting a signal photon), is caused to reconfigure the optical path for the idler photon towards the first detector 14. The reconfiguration of the path is ideally only maintained for a period of time long enough to allow the corresponding idler photon to pass through the gating switch 54. The time it takes the idler photon to exit the photon pair source 6 and propagate to the gating switch 54 must be matched to the time it takes for: the signal photon to exit the photon pair source 6, be detected by the second detector 16 and; the resulting electrical signal to arrive at the gating switch 54 and reconfigure the idler optical path.

The gating switch setup therefore only allows a photon travelling along the idler optical path to reach the detector 14 if it was output at the same time as the signal photon. The resulting effect on the spectroscopy apparatus 2 is the ability to attain sub-Poissonian statistics, hence sub shot noise performance. Using this scheme allows sub shot noise performance without using coincidence counting even when the combined optical losses in the optical paths to the detectors is less than 100% as described above.

Variations

Figure 8:
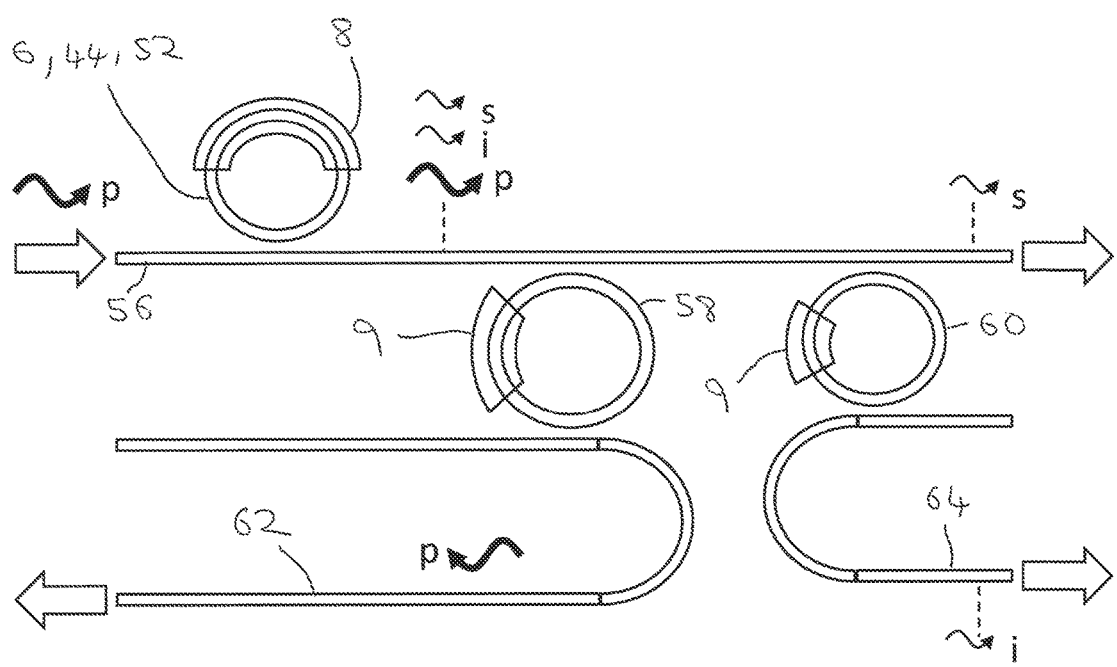
FIG. 8 shows an example of a spectroscopy apparatus comprising a micro-ring resonator photon pair source.

FIG. 8 shows a further example of a spectroscopy apparatus 2 whereby the photon pair source 6 is an optical resonator 52.

The apparatus 2 exemplified in FIG. 8 (and FIGS. 9, 10, 12 and 13) is preferably formed as an integrated optical device 44, 52. The integrated optic waveguides may be any type of integrated optic waveguide in principle including buried structures, but are preferably rib structures with a rectangular cross section wherein the bottom edge of the waveguide core 46 is adjacently contacting a cladding layer 48. For a rib structure it is preferred that both side edges and the top are surrounded by air (air-clad) as shown in FIG. 11, however any rib/ridge waveguide structure may be used including having one or more further material layer on top of the waveguide core 46 opposite the bottom edge adjacently contacting cladding layer 48. The waveguide core 48 may be any material but is preferably silicon. The undercladding is preferably silica ($SiO_2$) cladding 48. The waveguide dimensions and refractive indices are preferably chosen to be single mode for the wavelengths of interest (i.e. the pump, signal and idler wavelengths). The core may have any cross sectional dimension, but is preferably a silicon core rectangular waveguide with a 220 nm height and a 500 nm width +/−1 nm.

The resonator 52 in FIG. 8 and any of the examples described herein is shown to be an integrated optic ring resonator 52, 44, although in principle any optical resonator may be used. Each ring resonator structure 52, 44 is a waveguide supporting optical modes forming a closed loop. The rings may have any in plane design (i.e. perpendicular to the cross section of the waveguide) in principle including an ellipse or a racetrack. A different optical resonator that could be used for a photon pair source 6 is a resonator formed by having two reflective elements (for example Bragg gratings) at either the end of a waveguide 44, thus creating a resonant cavity. The reflective elements could be designed to reflect only certain wavelengths or a range of wavelengths. Another type of optical resonator could be a further type of circulating resonator such as a disc resonator.

Pump light is input from a pump source 4 (not shown) into an input waveguide 56. FIG. 8 shows this waveguide 56 to be a straight waveguide; however in principle the input waveguide 56 may have bends and other in plane designs. The pump photons travelling down the input waveguide 56 then come to a region where the ring resonator 52, 44 photon pair source is in proximity to the input waveguide. At this close proximity the input waveguide 56 and the ring 52, 44 form a directional coupler that allows the light to be evanescently coupled into the ring 52, 44. The coupling arrangement may not be limited to a directional coupler, in principle by an optical coupling arrangement that allows light to be transferred to or from the ring 52, 44 or input waveguide 56, for example an Multi-Mode Interference (MMI) coupler.

A portion of the pump light propagating along the input waveguide 56 is coupled into the ring 52, 44. The pump light then propagates around the ring 52, 44 and in principle (depending on the ring resonator design) may couple back out of the ring 52, 44. As the pump light propagates around the ring, pump photons have a possibility of being converted into a photon pair. Some principles of ring resonators are now described.

Ring Resonators

Ring resonators support resonant optical modes or particular wavelengths according to the specific design of the optical cavity.

The wavelength resonant spacing $\Delta\lambda$ of a single ring resonator coupled to a bus guide (for example the input waveguide 56 in FIG. 8) can be shown to be given by the following equation:

$$\Delta\lambda = -\left(\frac{\lambda^2}{NL}\right) \quad [7]$$

Where N is the group index of the mode in the ring and L is the ring resonator length. The 'transmission' for such a system refers to the light which continually propagates along the bus guide after the ring resonator, i.e. the combination of the light not coupled into the ring from the bus guide together with the light coupled back out of the ring into the bus guide. Which wavelengths of light actually continue to propagate along the bus guide is determined by the ring and ring/bus guide coupling design as follows.

It can be shown that for a single ring resonator coupled to a straight 'bus' waveguide similar to the input waveguide 56 shown in FIG. 8, the intensity transmittance of the optical ring resonator, as a function of wavelength is:

$$T(\phi) = (1-\gamma)\left[1 - \left(\frac{(1-x^2)(1-y^2)}{(1-xy^2) + 4xy\sin^2(\phi/2)}\right)\right] \quad [8]$$

Where:

$$x = (1-\gamma)^{\frac{1}{2}}\exp\left(-\frac{\rho}{2}L\right) \quad [9]$$

$$y = \cos(\kappa\iota) \quad [10]$$

$$\phi = \beta L = \frac{2\pi}{\lambda}L \quad [11]$$

Where κ is the mode coupling coefficient determined primarily by the bus and ring cross sections and their proximity to each other, τ, is the coupling length of the ring and bus guide, γ is the intensity insertion loss coefficient (i.e. the inherent loss associated with presence of the ring perturbing the optical mode in the bus guide), ρ is the intensity attenuation coefficient of the mode propagating around the ring, β is the propagation constant of the mode.

Therefore a ring resonator can theoretically be designed such that for particular wavelengths, light is coupled into the ring and destructively interfered on its exit with coherent light from the same source so that no optical modes at that wavelength are propagated down the bus guide beyond the coupling point of the ring resonator.

Optical Resonators for Use in the Spectroscopic Apparatus

The photon pair ring 44, 52 can therefore be designed so that pump light is coupled into the ring and allowed to propagate/circulate to increase the likelihood of a photon pair to be generated from each successive pass of photons around the ring 44, 52. This requires that the pump light is coherent and that the ring 52, 44 has resonances at the wavelength of the pump light. Preferably the pump light is monochromatic coherent light, for example laser light, so that substantially all of the pump light forms resonant optical modes in the ring.

Coupling the pump light into the ring allows the intensity of pump light in the ring waveguide 52, 44 to be greater than that of the bus waveguide 56, hence increasing the probability of photon pair generation. Photon pairs are only generated within the ring at the resonant wavelengths supported by the ring. When a photon pair is generated, we do not know where in the ring 52, 44 they are generated. Furthermore each photon of the photon pair has a probability amplitude (dictated by its wavefunction) of a particular length. Both of these effects entail that signal and idler photons only get generated when each photons wavefunction constructively interferes with itself in the ring 52, 44.

When using a $\chi^3$ nonlinear optical process such as FWM in a silicon waveguide, two pump photons get annihilated to create a signal and idler photon pair. The pump wavelength is aligned to one resonance of the ring 52, 44. The photon pair in the resonator get created at the resonances either side of the pump resonance of the ring.

The signal and idler photons may couple out of the ring into the bus guide 56. However, unlike the pump photons which destructively interfere with incoming pump light travelling along the bus guide, the signal and idler photons do not destructively interfere as they are at a different wavelength to the pump light.

The ring resonator photon pair source 52, 44 shown in FIG. 8 has a thermo-optic heater tuning means 18 deposited on top of the ring structure. By changing the local temperature of the core material of the ring photon pair source 52, 44, the refractive index changes, which in turn changes the wavelengths at which transmission minima occur. The wavelengths at which transmission minima occur are the wavelengths that constructively interfere within the ring. Using the thermo-optic effect is one example of changing the refractive index of the ring, however in principle any mechanism may be used to induce an optical path length change in the optical resonator 52, 44.

By changing the refractive index of at least a portion of the ring 52, 44, the optical path length around the ring 52, 44 changes which leads to different wavelengths signal and idler photons being created because of the change in ring resonance. In this configuration, the pump wavelength also needs to change to match one of the new resonances in the ring 52, 44 resulting from the optical path length change. The example shown in FIG. 8 therefore preferably uses a range of pump sources 4 of different wavelengths and/or one or more wavelength tuneable pump sources 4.

One preferred wavelength range of operation for an apparatus used a ring optical source 52, 44 is: 1400-1700 nm. A preferable resonator path length L is: 10<L<600 µm with a preferred pump power per pulse of 0.1 to 100 pJ being input into the bus guide 56.

Preferably the coupling strength from the bus waveguide 56 to the ring 52, 44 (with respect to the amplitude of the light) κ is: 0.00001<κ<0.1, however any coupling strength may be used in principle.

After the signal and idler photon pair have been generated and coupled out of the ring 52, 44, the signal and idler are preferably separated into separate physical paths for detection as in the previous examples. Preferably, filtering devices are also provided to further remove any unwanted pump light that has not been removed by the photon pair source ring 52, 44.

This may be done using any suitable filtering mechanism including bulk optic filters or integrated optic filters. FIG. 8 shows an example where two further ring resonators 58, 60 are used to couple out the pump photons into a first further separate output bus guide 62 and couple the idler photons out into a second further separate bus guide 64 so that the signal photons are output from the original input bus guide 56. In this example the second ring 58 that couples out the pump photons has an optical resonance at the pump wavelength, but no optical resonances at the signal or idler wavelength. Similarly, the third ring 60 that couples out the idler has an optical resonance at the idler wavelength, but no optical resonances at the signal wavelength. Similarly to the photon pair source ring 52, 44, these ring are configured to be tuneable so that their optical path length can change, thus changing the wavelength filtered out. FIG. 8 shows these rings 58, 60 to have thermo-optic heaters, however in principle, any optical path length change inducing mechanism or technique may be used.

Figure 9:
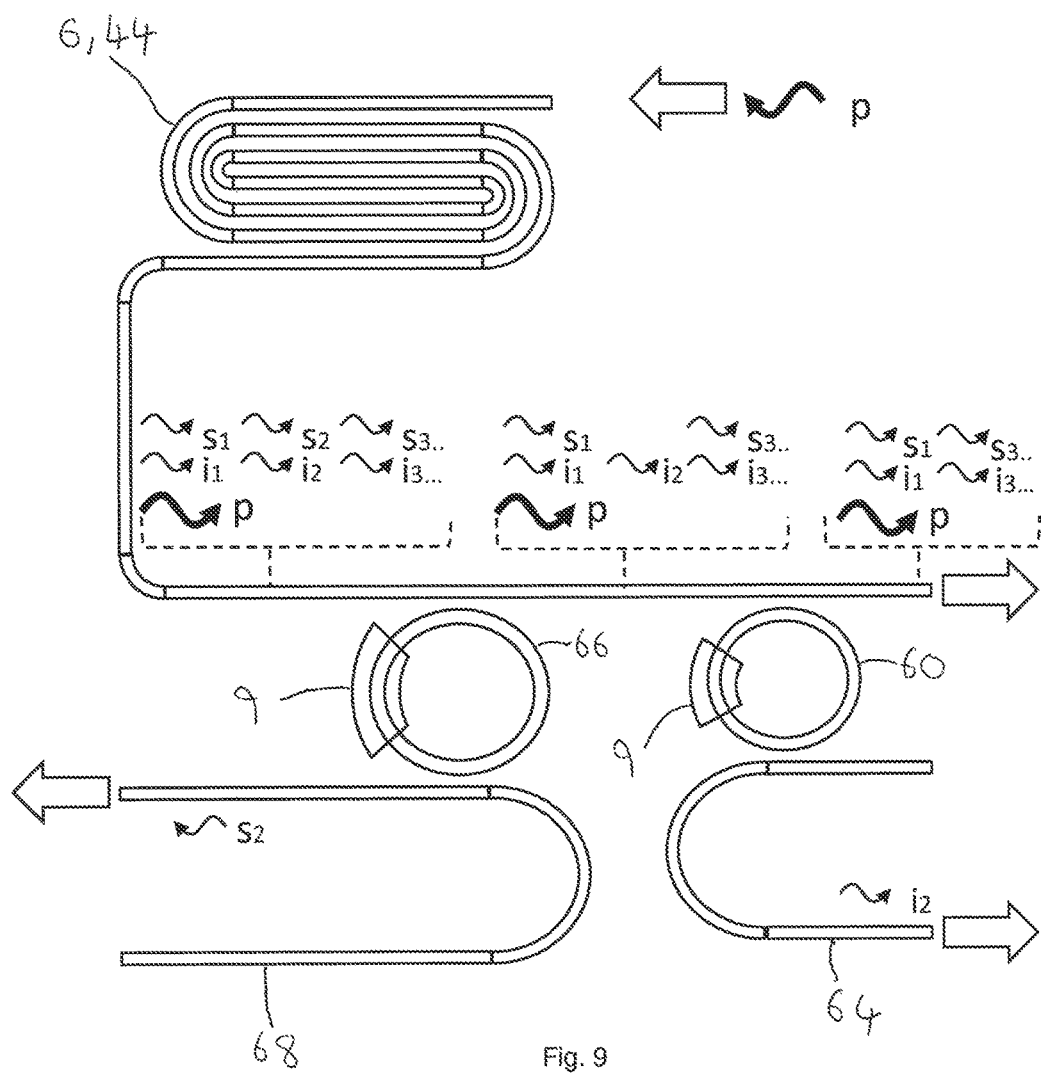
FIG. 9 shows a spectroscopy apparatus comprising a serpentine integrated optical waveguide photon pair source and two ring resonator filters.

FIG. 9 shows a similar configuration to FIG. 8 except that the photon pair source 6 is a long length of waveguide 44, which in FIG. 9 is arranged as a serpentine circuit. In this example, the photon pairs output by the photon pair source 6 have a wide range of wavelengths because, unlike the ring photon pair source 44, 52 in FIG. 8, there is no mechanism to force the photon pairs to be generated at resonant wavelengths. The pump photons and signal idler photons are then passed along a waveguide coupled with two ring resonators 60, 66. The first ring 66 has a resonance configured to couple out the signal photon whilst the second ring 60 has a resonance that couples out the idler photon similar to FIG. 8. Each ring 64, 66 is coupled to a further separate output waveguide 64, 68 (one output waveguide per ring) that guides the signal and idler photons. The rings 60, 66 are shown in FIG. 9 to have thermo-optic phase shifters 9 similar to the example shown in FIG. 8.

One preferred wavelength range of operation for this type of design is 1500-1600 nm. The serpentine path length 'L' is preferably 1 mm<L<2 cm with a preferred pump power per pulse of 0.1 to 10 nJ entering the serpentine photon pair source 6.

Figure 10:
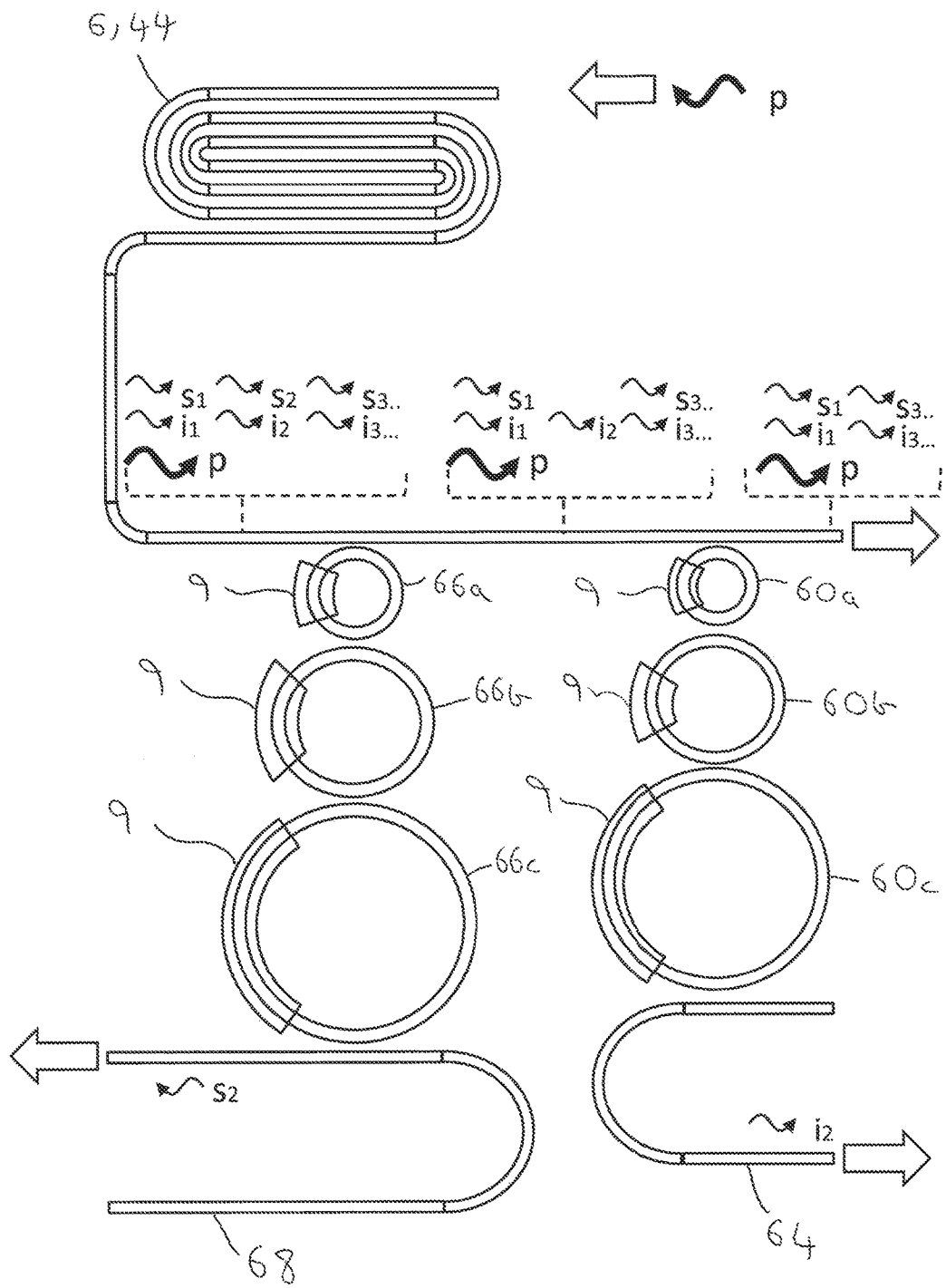
FIG. 10 shows a spectroscopy apparatus similar to FIG. 9 comprising a serpentine integrated optical waveguide photon pair source and two filters, each filter having three coupled ring resonators.
Figure 11:
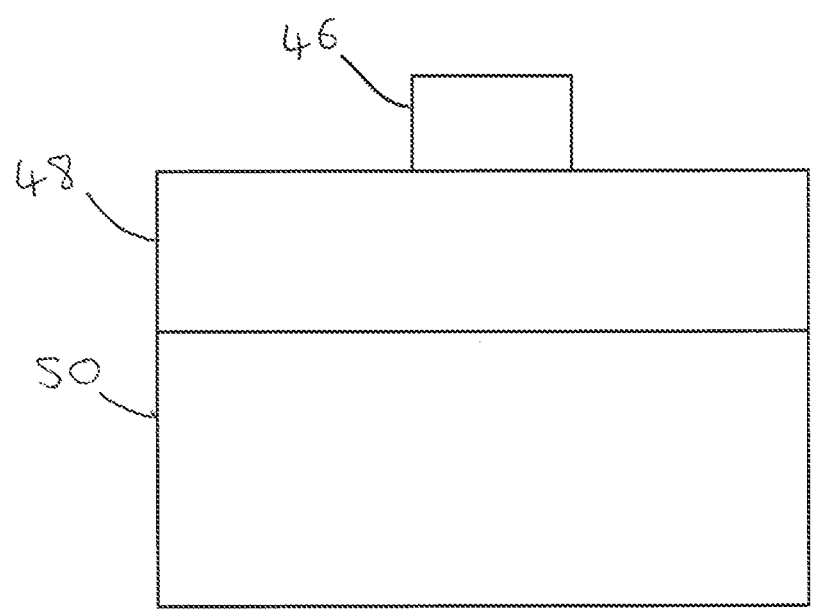
FIG. 11 shows a cross section of an integrated optic waveguide suitable for use in a spectroscopy apparatus as described herein.

FIG. 10 shows an example similar to FIG. 9 except that each ring filter 60, 66 comprises a concatenation of three coupled rings wherein: the first ring (60a, 66a) of each filter is coupled to the input bus guide 56 and the second ring (60b, 66b); the second ring (60b, 66b) is coupled to the first (60a, 66a) and third rings (60c, 66c); whilst the third ring (60c, 66c) is coupled to the second ring (60b, 66b) and a separate output bus guide (64, 68). Each ring in this configuration has a different diameter, hence optical path length around the ring. Each ring also has the capability of having its optical path changed, for example using thermo-optic phase shifters 9 as described previously. Having rings of different diameters, hence resonances, coupled together entails that the 3-ring filter 60, 66 has an overall transmission response determined by the Vernier effect. Such a filter therefore has the capability to filter one particular wavelength from a broader range of wavelengths than one of the single rings alone. Such Vernier ring filters may in principle have two or more rings wherein at least one ring has a different optical path length than another ring. The rings may be any circulating optical resonator design in principle, for example a racetrack design or a disc.

Filters

In principle any number of filters may be used to filter out any of the pump and/or signal and/or idler photons, in any of the above examples. In some devices, some pump photons may not be filtered out with a single pump filter; therefore multiple pump filters are required to obtain a satisfactory extinction ratio of pump light. For example it may be preferable to include multiple ring filters to reduce the likelihood of pump photons being output from the waveguides guiding the signal and idler photons. In principle, any of the pump filters described herein may be situated between the output of the photon pair source and the input to the detectors 14, 16.

FIG. 12 shows an example of a ring resonator based filter for filtering out pump light that is co-propagating with the signal and idler photons along a waveguide. This filter comprises a plurality of substantially identical rings 70 wherein each ring is coupled to an adjacent ring by at least one bus waveguide 72. The connecting bus waveguides are shown as U-shaped in FIG. 11. Each ring 70 in FIG. 11 comprises an optical path length that provides resonances at the signal and idler wavelengths but not at the pump wavelengths. The signal and idler photons are coupled from a first input waveguide 74 into the first ring 70, and then subsequently coupled output into an intermediate waveguide 72. The pump photons continue to propagate along the input waveguide 74. The intermediate waveguide 72 then couples to a further ring 70, which in turn couples to a further intermediate waveguide 72 until the last ring 70 which couples out the signal and idler photons into an output waveguide 76. Each coupling where an intermediate waveguide 72 inputs light into a ring 70, increases the probability that pump photons do not continue co-propagating with the signal and idler photons. This configuration may be designed so that the rings 70 resonantly propagate both the signal and idler photons or just one of them. Preferably the filter has more than 4 rings 70, preferably 8 or more rings 70. Each ring 70 in between the intermediate waveguides 72 may be a Vernier ring filter. Any of the rings 70 may be optical path length tuneable.

If the photon pair source comprises an optical resonator, such as the ring shown in FIG. 8, then using the pump rejection filter described above for FIG. 12 is preferable. The filter shown in FIG. 12 could be used in combination with the second and third (filtering) rings already shown in FIG. 8, or as an alternative to one or more of the rings (for example replacing the pump suppression ring 58 in FIG. 8). The rings 70 in the filter are required to be tuned as the photon pair source ring 52, 44 is tuned. If both signal and idler photons are output from the filter in FIG. 12, then, in some examples of the spectroscopy apparatus, a further filter mechanism is required to split the signal/idler photons into separate optical paths.

FIG. 13 shows an example of a pump suppression filter comprising a set of rings 78 sequentially coupled to an input bus guide 80. In this example the rings 78 are designed to filter out the pump light and allow the signal and idler photons to continue propagating down the input bus guide 80. Each ring is coupled to a separate output waveguide 82 that couples out the pump photons propagating in the ring 78. The example shows 5 rings 78, one after another coupled along the same bus guide 80, however in principle any number of rings 78 can be used, including Vernier ring filters. Any of the rings may be optical path length tuneable.

This pump suppression filter is preferably used with examples using a non-resonant optical structure for the photon pair source, such as the serpentine circuit photon pair source examples shown in FIGS. 9 and 10. The pump suppression filter coupled be introduced anywhere after the serpentine source, preferably before the signal and idler photon ring filters 60, 66 used to couple out the signal/idler photons.

FIG. 14 shows a further filter design comprising a cascade of filter blocks 84. Each block comprises a filter structure comprising at least one input port 88 and at least two output ports 88. One of the output ports 88 from one of the blocks 84 optically couples to an input port 86 of a subsequent block 84. The filter structure may be identical or different, but is preferably substantially identical. The filter structures are preferably formed as an integrated optic structure, although in principle any optical technology may be used to create the overall filter including fibre optics, and bulk components.

Each filter structure preferably has one input optical port 86 wherein light couples into a waveguide. This waveguide then is input into a first coupler 90 designed to couple a portion of the light into two output waveguides 96a, 96b. This coupler may be a 1×2 or a 2×2 coupler. The waveguides 96a, 96b output from the first coupler 90 are then input into a second coupler 92. These waveguides are non-identical in length (i.e. they are unbalanced) such that the longer waveguide 96b has an optical path length difference of over the shorter waveguide 96a. The second coupler 92 is a 2×2 coupler with a further two output waveguides 98a, 98b. The further two output waveguides 98a, 98b are unbalanced by 2 L (hence waveguide 98b has an excess length of 2 L over 98a) and are input into a third coupler 94. The third coupler 94 is a 2×2 coupler. The two output waveguides of the third coupler are in optical communication with the output ports 88 of that particular filter structure.

The couplers in this example may be any coupler but are preferably evanescent couplers (for example a directional coupler) or an MMI coupler.

Each filter block is configured to accept pump light and signal/idler light, output the pump light from one of the output ports 88 whilst outputting signal/idler light from the other output port 88. A further filter structure (block) is optically coupled to the output port with the signal idler light. By having two or more of these filter structures optically connected in series (hence forming the overall filter), any unwanted pump light is successively filtered out from the output carrying the signal/idler photons.

Preferably, in any of the examples, the filtering mechanisms suppress the pump light such that statistically there are only 0.01 photons from the pump passing through the channels that are designed to carry the signal/idler photons. Preferably this suppression is a 60-120 dB extinction in the pump bandwidth. Preferably the optical paths that are intended to carry the signal/idler photons have only a 0.01-0.5 dB loss at the signal/idler bandwidths.

Any of the described pump rejection filters may be used in any of the spectroscopy apparatus described herein.

Any of the features described with reference to FIGS. 8-14 may be formed as a single integrated optic device or a plurality of optically connected integrated optic devices.

The integrated devices may be configured to house a medium under test 10.

The integrated devices may further comprise one or more detectors for use with the spectroscopy apparatus.

The spectroscopy apparatus may comprise any of the integrated optic features described in the above examples.

Embodiments of the present invention have been described with particular reference to the examples illustrated. However, it will be appreciated that variations and modifications may be made to the examples described within the scope of the present invention.

What is claimed is:

1. A spectroscopy apparatus for measuring an optical property of a medium under test by detecting one or more photons of a photon pair, the apparatus comprising:
   I) a phase-matched photon pair source configured to receive pump light, to convert at least one pump light photon into a wavelength non-degenerate signal and idler photon pair, and to output the signal and the idler photon pair, the signal and idler photons being distinguishable from each other by at least one photon optical property;
   II) a thermal tuning device configured to thermally tune the phase-matched photon pair source to change the wavelengths of the signal and idler photons output from the photon pair source; and
   III) a photon splitter configured to deterministically separate the signal and idler photons using the at least one photon optical property,
   wherein the apparatus is configured to:
      direct at least one photon of the photon pair to be incident upon the medium under test; and
      output at least one of the signal or the idler photons for detection.

2. An apparatus as claimed in claim 1, wherein the phase-matched photon pair source is configured to:
   generate signal photons having a wavelength within a first range of signal wavelengths and generate idler photons having a wavelength with a first range of idler wavelengths; and
   output signal photons having a wavelength within a second range of signal wavelengths that is narrower than the first range of signal wavelengths and output idler photons having a wavelength within a second range of idler wavelengths that is narrower than the first range of idler wavelengths.

3. An apparatus as claimed in claim 2, wherein the thermal tuning device is configured to change the second range of idler wavelengths and the second range of signal wavelengths.

4. An apparatus as claimed in claim 1, wherein the thermal tuning device is configured to provide electrical current to the photon pair source to change the wavelengths of the signal and idler photons output from the photon pair source.

5. An apparatus as claimed in claim 1, wherein the photon splitter is configured to receive the photon pair and separate the photon pair by causing one of the photons of the photon pair to propagate along a first optical path and the other photon of the photon pair to propagate along a second optical path different to the first optical path, and be incident upon the medium under test.

6. An apparatus as claimed in claim 5, comprising:
   a first light detector arranged to detect photons propagating along the first optical path; and
   a second light detector arranged to detect photons propagating along the second optical path.

7. An apparatus as claimed in claim 6, wherein the second optical path is further configured to receive the said other photon after interacting with or being operated upon by the medium under test, wherein the second light detector is arranged to detect the said other photon after interacting with or being operated upon by the medium under test.

8. An apparatus as claimed in claim 6, further comprising an electronic comparator, wherein: the first and second light detectors are each configured to generate corresponding first and second electrical signals upon detection of a photon from the photon pair; and
   the comparator is configured to receive the first and second electrical signals, and output an output count signal based upon the receiving of at least one of the first and second electrical signals.

9. An apparatus as claimed in claim 5, wherein the signal photon has an orthogonal polarisation to the idler photon, and the photon splitter comprises a polarisation splitter.

10. An apparatus as claimed in claim 1, wherein the photon pair source is configured to convert at least one pump light photon into a signal and idler photon pair using a $\chi^2$ nonlinear optical process.

11. An apparatus as claimed in claim 10, wherein the $\chi^2$ nonlinear optical process is spontaneous parametric down conversion.

12. An apparatus as claimed in claim 1, wherein the photon pair source comprises a collinear phase matched crystal.

13. An apparatus as claimed in claim 1, wherein the photon pair source comprises a circulating optical resonator.

14. An apparatus as claimed in claim 13, wherein the circulating optical resonator is an integrated optic resonator.

15. An apparatus as claimed in claim 14, further comprising an integrated optic waveguide configured to receive and guide the pump light, wherein the circulating optical resonator is optically coupled to the integrated optic waveguide such that at least a portion of pump light within the integrated optic waveguide is coupled into the circulating optical resonator.

16. An apparatus as claimed in claim 13, wherein the photon pair source is configured to convert at least one pump light photon into a signal and idler photon pair using a $\chi^3$ nonlinear optical process.

17. An apparatus as claimed in claim 16, wherein the $\chi^3$ nonlinear optical process is four wave mixing.

18. An apparatus as claimed in claim 1, further comprising a first integrated optic filter configured to:
   receive pump, signal and idler photons from the photon pair source; and
   separate at least one of the signal photons or idler photons from the pump photons such that the said signal photons or idler photons are output into a different output optical path to the pump photons.

19. An apparatus as claimed in claim 18, wherein the first integrated optic filter comprises a one or more circulating optical resonators and wherein the first optic filter comprises one or more output waveguides, wherein each output waveguide is configured to couple light out of a different one of the one or more optical resonators.

20. An apparatus as claimed in claim 19, wherein each output waveguide is configured to input light into a further one of the one or more circulating optical resonators.

21. An apparatus as claimed in claim 18, further comprising a second integrated optic filter configured to separate the signal and idler photons into different output optical paths.

22. A spectroscopy method for measuring an optical property of a medium under test, the method comprising:
   I) converting at least one pump light photon into a signal and idler photon pair using a phase-matched photon pair source, the signal and idler photons being distinguishable from each other by at least one photon optical property;
   II) outputting the signal and idler photon pair from the photon pair source;
   III) deterministically separating the signal and idler photons using the at least one said photon optical property;
   IV) directing at least one photon of the photon pair to be incident upon the medium under test;
   V) detecting at least the one of the photons of the photon pair; and
   VI) thermally tuning the photon pair source to change the wavelengths of the signal and idler photons output from the photon pair source.

23. A method as claimed in claim 22, further comprising:
   splitting the photon pair so that:
      one of the photons of the pair propagates along a first optical path to be detected by a first detector; and
      the other photon of the photon pair propagates along a second optical path to be incident upon the medium under test, and then is subsequently detected by a second detector.

24. A method as claim in claim 23, further comprising:
   I) generating a first electrical signal when the first detector detects one of the photons of the photon pair;
   II) generating a second electrical signal when the second detector detects the other photon of the photon pair; and
   III) comparing the presence of the first and second electrical signals generated from detecting one or more of the photons from the photon pair to determine the optical property of the medium under test.

25. A spectroscopy apparatus for measuring an optical property of a medium under test by detecting one or more photons of a photon pair, the apparatus comprising:
   a phase matched photon pair source configured to:
      receive pump light;
      convert at least one pump light photon into a wavelength non-degenerate signal and idler photon pair, the signal and idler photons being distinguishable from each other by at least one photon optical property; and
      output the signal and idler photon pair; and
   a thermal tuning device configured to thermally tune the photon pair source to change the wavelengths of the signal and idler photons output from the photon pair source;
   a photon splitter configured to deterministically separate the signal and idler photons using the at least one photon optical property;
   the apparatus being configured to direct at least one photon of the photon pair to be incident upon the medium under test; and
   the apparatus further comprising a detector configured to detect the signal and idler photons and discriminate between the signal and idler photons using the at least one photon optical property.

* * * * *